United States Patent
Holcombe

(10) Patent No.: US 8,253,613 B2
(45) Date of Patent: Aug. 28, 2012

(54) SECOND-ORDER DELTA-SIGMA ANALOG-TO-DIGITAL CONVERTER

(75) Inventor: Wayne T. Holcombe, Mountain View, CA (US)

(73) Assignee: Silicon Laboratories, Inc., Austin, TX (US)

( * ) Notice: Subject to any disclaimer, the term of this patent is extended or adjusted under 35 U.S.C. 154(b) by 49 days.

(21) Appl. No.: 12/956,775

(22) Filed: Nov. 30, 2010

(65) Prior Publication Data

US 2011/0248875 A1    Oct. 13, 2011

Related U.S. Application Data

(60) Provisional application No. 61/323,798, filed on Apr. 13, 2010.

(51) Int. Cl.
    *H03M 3/00*    (2006.01)
(52) U.S. Cl. ......... 341/143; 341/144; 341/155; 341/156
(58) Field of Classification Search .......... 341/143, 341/155, 156, 144
    See application file for complete search history.

(56) References Cited

U.S. PATENT DOCUMENTS

| | | | | | |
|---|---|---|---|---|---|
| 5,148,166 | A | * | 9/1992 | Ribner | 341/143 |
| 5,162,799 | A | * | 11/1992 | Tanimoto | 341/143 |
| 5,736,950 | A | * | 4/1998 | Harris et al. | 341/143 |

OTHER PUBLICATIONS

Proximity Sensor Algorithms; Intersil, Application Note 1427.0, Sep. 25, 2008.
Proximity Sensors; Intersil, Application Note 1436.0, Mar. 26, 2009.
Integrated Digital Ambient Light Sensor and Proximity Sensor; Intersil, ISL29015, Data Sheet FN6522.0, Oct. 31, 2008.
Digital Ambient Light Sensor and Proximity Sensor with Interrupt Function; Intersil, ISL29018, Data Sheet FN6619.0, Mar. 3, 2009.

\* cited by examiner

*Primary Examiner* — Jean B Jeanglaude
(74) *Attorney, Agent, or Firm* — Meyertons, Hood, Kivlin, Kowert & Goetzel, P.C.; Dean M. Munyon; Paul T. Seegers

(57) ABSTRACT

In one embodiment, a second-order delta-sigma analog-to-digital converter (ADC) includes a second-order integrator adapted to second-order integrate a value at a first node, where the first node is coupled to an input of the ADC. The ADC also includes a comparator coupled to an output of the second-order integrator. The ADC further includes a digital-to-analog converter (DAC) coupled between an output of the comparator and the first node. The DAC is adapted to receive a digital output of the comparator and to generate a first charge or a second charge. The DAC includes a first charge pump adapted to produce the first charge and a second charge pump adapted to produce the second charge. The first and second charges are asymmetric.

23 Claims, 13 Drawing Sheets

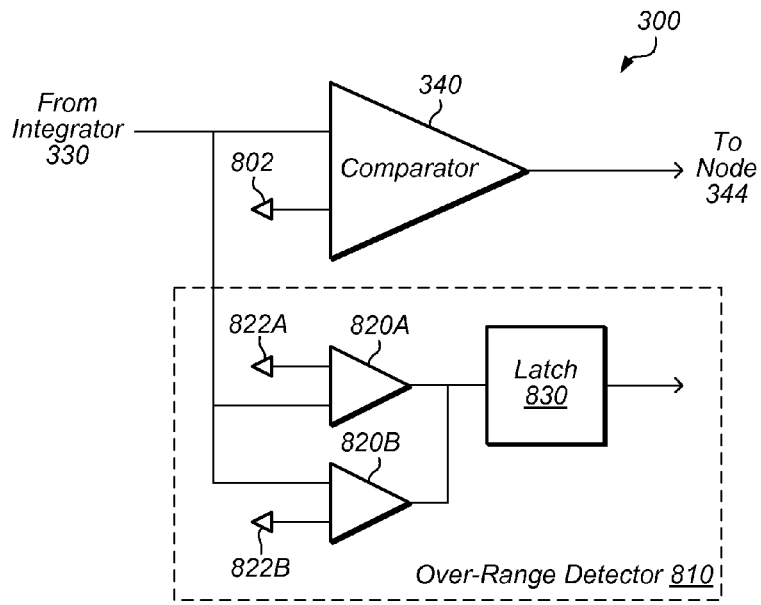
FIG. 8
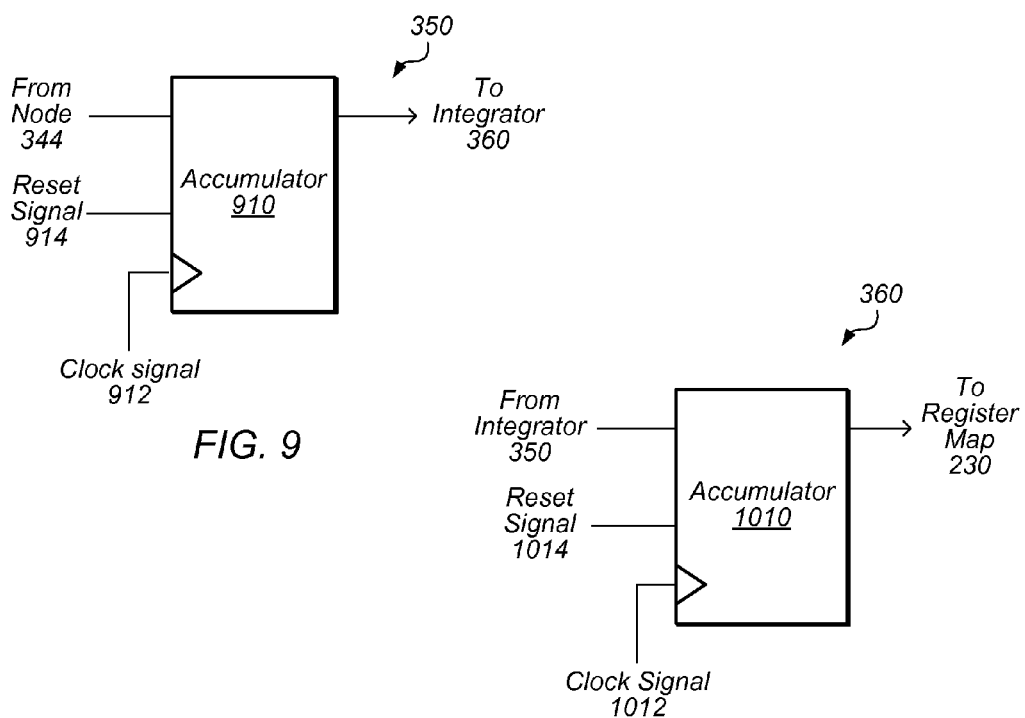
FIG. 9
FIG. 10

SECOND-ORDER DELTA-SIGMA ANALOG-TO-DIGITAL CONVERTER

CROSS REFERENCE TO RELATED APPLICATIONS

This disclosure claims priority to U.S. Patent Provisional Application No. 61/323,798, entitled "APPARATUS WITH OPTICAL FUNCTIONALITY AND ASSOCIATED METHODS" filed on Apr. 13, 2010, which is incorporated by reference herein in its entirety.

BACKGROUND

1. Technical Field

The disclosure relates generally to integrated circuits, and, more particularly, to analog-to-digital converters in integrated circuits.

2. Description of the Related Art

Analog-to-digital converters (ADCs) are frequently used in a variety of devices in which it is desirable to convert an analog signal to a digital signal. For example, ADCs may be found in a variety of communication devices such as radios, cell phones, modems, etc. ADCs may also be found in a variety of computer components, such as sound cards, network cards, I/O devices, etc. ADCs may also be used in optical sensors, which use ADCs to convert analog signals created by photodiodes into digital signals. ADCs, of course, may be used in a variety of other applications.

In systems that use ADCs, it may be desirable to minimize the presence of noise, which can affect an ADC's ability to accurately sample analog signals. Accordingly, designers typically use a variety of techniques to improve the signal-to-noise ratio of signals being sampled.

SUMMARY

The present disclosure describes various embodiments of structures including second-order delta-sigma analog-to-digital converters (ADCs), which may in some embodiments minimize the presence of noise and permit a higher signal-to noise ratio.

In one embodiment, an apparatus is disclosed that includes a second-order delta-sigma ADC. The ADC includes a second-order integrator adapted to second-order integrate a value at a first node, where the first node is coupled to an input of the ADC. The ADC also includes a comparator coupled to an output of the second-order integrator. The ADC also includes a digital-to-analog converter (DAC) coupled between an output of the comparator and the first node. The DAC is adapted to receive a digital output of the comparator and to generate a first charge corresponding to a first logical value or a second charge corresponding to a second logical value. The DAC includes a first charge pump adapted to generate the first charge and a second charge pump adapted to generate the second charge. The value at the first node is based in part on the generated charge. A magnitude of first charge is at least twice a magnitude of the second charge.

In another embodiment, a method is disclosed that includes receiving an analog signal at a node of a delta-sigma ADC. The analog signal is a based on an input of the ADC and an output of a digital-to-analog converter (DAC) of the ADC. The method further includes the ADC performing a second-order integration of the analog signal to produce a digital value. The method further includes the DAC selecting, based on the digital value, one of a first charge corresponding to a first logical value or a second charge corresponding to a second logical value. The first and second charges are generated by separate charge pumps of the DAC, and a magnitude of the first charge is at least twice a magnitude of the second charge. The method further includes the DAC providing the selected charge to the first node.

In still another embodiment, an apparatus is disclosed that includes a second-order delta-sigma ADC. The ADC includes a second-order integrator adapted to second-order integrate a value at a first node, where the first node is coupled to an input of the ADC. The ADC also includes a comparator coupled to an output of the second order integrator. The ADC also includes a DAC adapted to provide a first analog output value or a second analog output value to the first node based on an output of the comparator. In such an embodiment, the first and second analog output values are asymmetric.

BRIEF DESCRIPTION OF THE DRAWINGS

FIG. 8 is a block diagram illustrating one embodiment of a comparator that may be included in the ADC.

FIG. 9 is a block diagram illustrating one embodiment of a first digital integrator that may be included in the ADC.

FIG. 10 is a block diagram illustrating one embodiment of a second digital integrator that may be included in the ADC.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The present disclosure describes a second-order delta-sigma ADC that employs various techniques to minimize the presence of noise and obtain a higher signal-to-noise ratio. In some embodiments, the ADC described herein may be used in conjunction with devices that use optical sensors, such as proximity devices. In other embodiments, the ADC may be used in other applications, such as those listed above.

Figure 1:
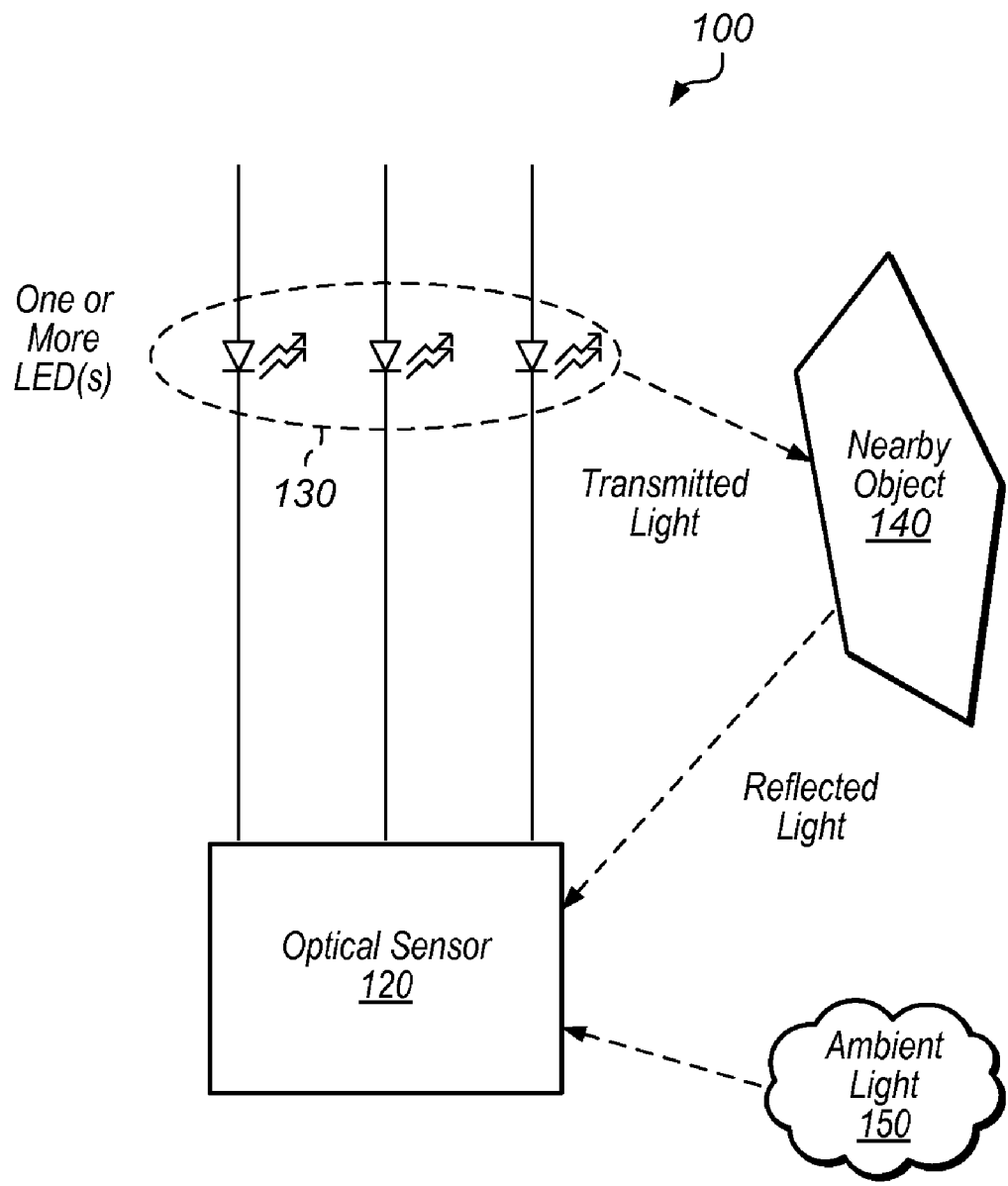
FIG. 1 is a block diagram illustrating one embodiment of a system that incorporates an optical sensor.
Figure 2:
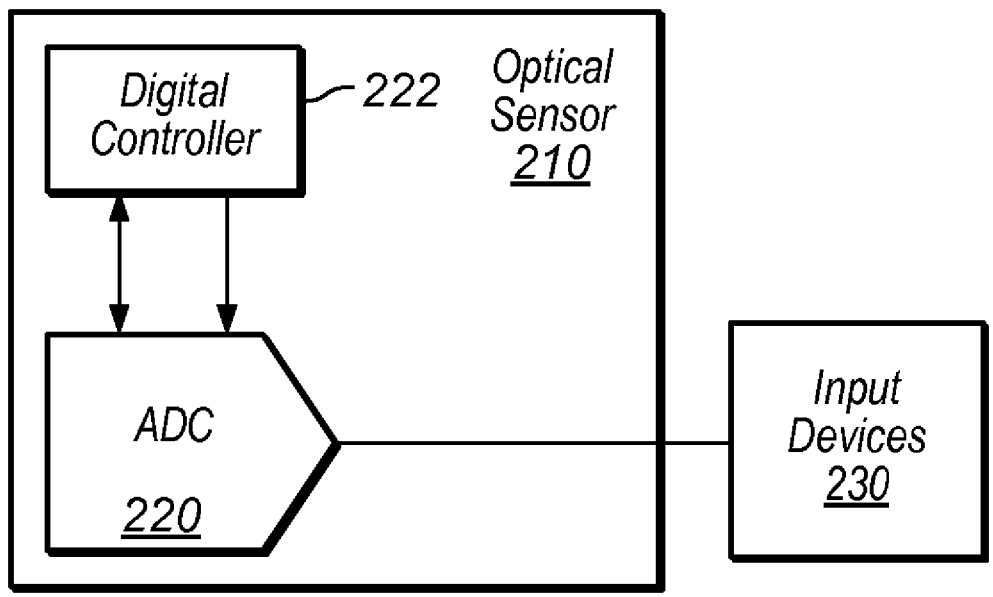
FIG. 2 is a block diagram illustrating one embodiment of an optical sensor.

The present disclosure first describes a system in which the ADC may be used, in conjunction with FIGS. 1 and 2. Next, description of the ADC is presented in conjunction with FIGS. 3-12. Then, a set of exemplary timing diagrams for one embodiment of the ADC is described in conjunction with FIGS. 13-14. Finally, a method that may be performed by the ADC is described in conjunction with FIG. 15.

Optical Sensor Overview

Turning now FIG. 1, a diagram of a system 100 incorporating an optical sensor 120 is depicted. In one embodiment, system 100 is configured as a proximity-sensing device that uses one or more light emitting diodes (LEDs) 130 to emit light that is reflected off an object 140. System 100 may then measure the amount of reflected light by using optical sensor 130. In various embodiments, optical sensor 120 may determine the amount of reflected light by taking a light measurement and removing noise produced by light sources other than LEDs 130 (e.g., ambient light 150). Based on the measured amount of reflected light, system 100 may determine information about an object, such as its identity, its distance from the sensor, its direction of movement with respect to the sensor, etc. Embodiments of an optical sensor that may be included in system 100 are described further below.

Turning now to FIG. 2, a diagram of an optical sensor 210 is depicted. In the illustrated embodiment, optical sensor 210 includes an analog-to-digital converter (ADC) 220 and a digital controller 222. ADC 220 may convert analog signals provided by input devices 230 to digital signals. In various embodiments, ADC 220 may employ a variety of techniques to reduce the presence of noise in analog signals. Digital controller 222 may process digital signals produced by ADC 220. Digital controller 222 may also control operation of ADC 220. In some embodiments, input devices 230 may include one or more visible light photodiodes, infrared ("IR") photodiodes, temperature sensors, etc. In one embodiment, optical sensor 210 may include one or more LED drivers that power LEDs 130 described above. Embodiments of an ADC that may be included in optical sensor 210 are described next.

Delta-Sigma Analog-to-Digital Converter

Figure 3:
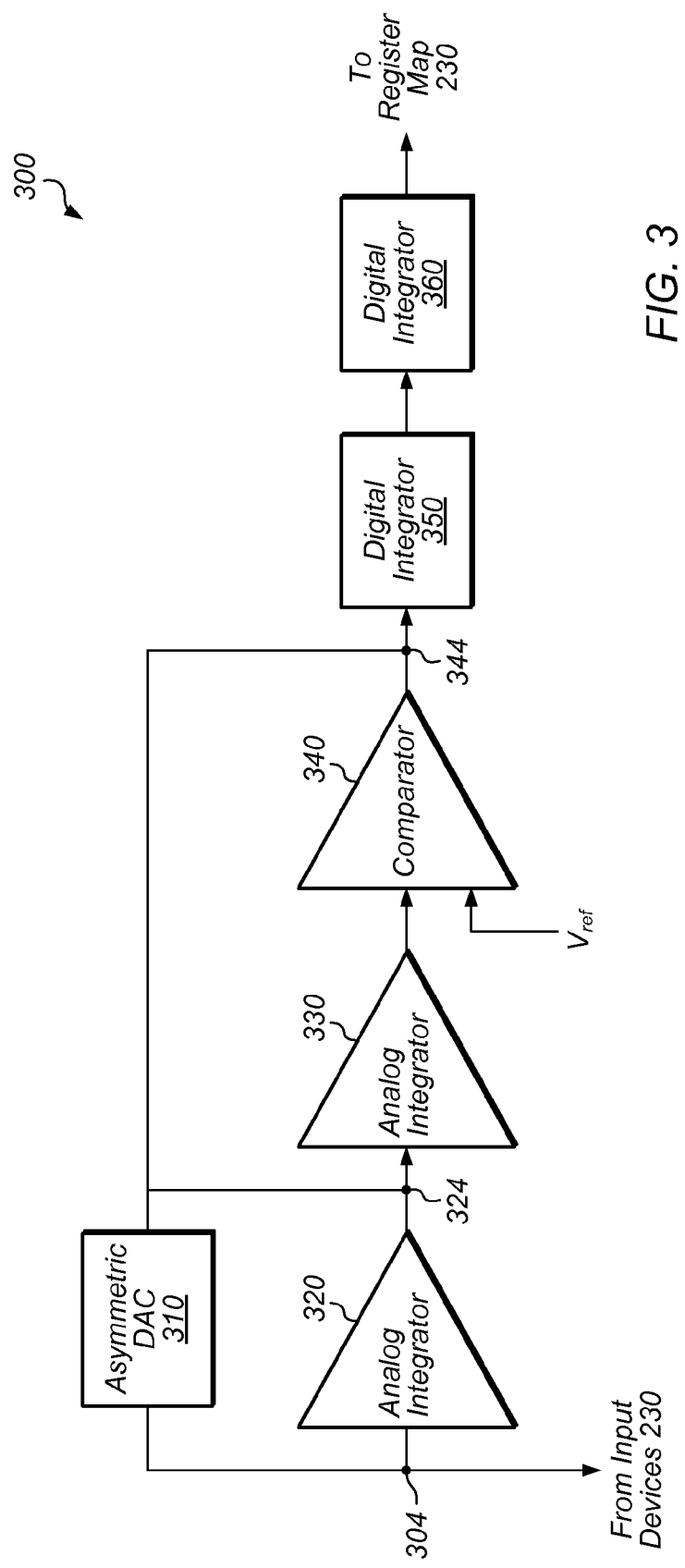
FIG. 3 is a block diagram illustrating one embodiment of an analog-to-digital converter (ADC) that may be included in the optical sensor.

Turning now to FIG. 3, a block diagram of ADC 300 is depicted. ADC 300 is one embodiment of a second-order delta-sigma analog-to-digital converter. As discussed above, ADC 300 may employ a variety of techniques to reduce the presence of noise. In some embodiments, ADC 300 may be used in an optical sensor such as sensor 210 described above. In other embodiments, ADC 300 may be used in other suitable applications. In the illustrated embodiment, ADC 300 includes an asymmetric digital-to-analog converter (DAC) 310, a first analog integrator 320, a second analog integrator 330, a comparator 340, a first digital integrator 350, and a second digital integrator 360.

In illustrated embodiment, ADC 300 is adapted to receive (i.e., receive during operation of ADC 300) an input signal at node 304 (which may be referred to herein as the input to ADC 300) from input devices 230. In some embodiments, the signal is a current that is created by reverse-biasing one or more photodiodes (described below). This reverse-bias current, in one embodiment, then flows from node 304 through the photodiodes to ground. As the photodiodes receive more or less light, this current increases or decreases, respectively. In one embodiment, ADC 300 is adapted to sample the voltage at node 304 (as the current changes) to produce a corresponding output of ADC 300. In various embodiments, suitable devices other than photodiodes may be coupled to the input of ADC 300.

Asymmetric DAC 310, in one embodiment, is adapted to generate positive and negative charges that drive currents at nodes 304 and 324 to raise or lower voltages at those nodes. In one embodiment, DAC 310 is adapted to determine whether to generate a positive charge or a negative charge dependent on the output of comparator 340 (described below). In one embodiment, if comparator 340 outputs a voltage value representative of a logical 1 (i.e., a '1' bit), DAC 310 is adapted to generate a positive charge corresponding to a logical 1 voltage value (i.e., a positive charge that raises the voltage at node 304 to a value that would be interpreted as a '1' bit) and drives a current from DAC 310 to node 304. In the illustrated embodiment, a portion of this current may flow into analog integrator 320, while the remaining portion becomes the reverse-bias current that passes through one of photodiodes 214 or 216 to ground. In one embodiment, if comparator 340 outputs a voltage value representative of a logical 0 (i.e., a '0' bit), DAC 310 is adapted to generate a negative charge corresponding to a logical 0 voltage value (i.e., a negative charge that lowers the voltage at node 304 to a value that would be interpreted as a '0' bit) and pulls a current from node 304 to DAC 310. In one embodiment, this negative charge may be used to pump negative current into photodiodes 214 or 216 to forward bias them to pre-charge photodiode minority carrier traps, thus causing low-level non-linearity in the photodiode response. (Pre-charging a photodiode is described in more detail in conjunction with FIG. 13.)

In one embodiment, DAC 310 is adapted to generate positive and negative charges that are asymmetric (as opposed to a conventional symmetric DAC that generates symmetric charges). A pair of signals may be symmetric if the magnitude of the nominal (designed) signal levels of the pair are the same, and that the polarity of the pair of signals is different. Balanced differential electrical signals, in which signal sources, levels, and termination impedances are the same but with reversed polarities, are therefore symmetric. For example, signals that have nominal voltage levels of +1.0 V and −1.0 V are symmetric. The term "symmetric" can also be used when referring to charge; thus, charges of +200 femtocoulombs and −200 femtocoulombs can be considered to be symmetric. A device that produces symmetric levels or charges can also be said to be "symmetric" (e.g., a symmetric DAC).

In practice, however, actual signal levels or electrical charges may vary from the nominal values. Two values that are within ±10% of the nominal values can still be considered symmetric, according to normal design specifications. Thus, for signal values having nominal levels of +1.0 V and −1.0 V, actual signal values of +1.0 V and −1.1 V would still be considered symmetric within the meaning of this disclosure. Furthermore, a DAC designed to produce symmetric charges of +200 and −200 femtocoulombs, but which actually produces charges of −195 and +205 femtocoulombs, would also be considered to be a symmetric DAC. A device can also be considered "symmetric" if it produces levels/charges having nominal magnitude values that are different, but are within ±10% of a common value. For example, a DAC designed to produce charges of +200 and −205 femtocoulombs is considered to be "symmetric" within the meaning of the present disclosure since both charges have a magnitude within ±10 of 200 femtocoulombs.

By producing asymmetric charges, DAC 310, in many instances, can improve the usable range for unidirectional signals being sampled by ADC 300 (such as signals produced by photodiodes), and thus improve the accuracy of ADC 300. For example, an ADC having a symmetric DAC may have a usable range of −2.6V to +2.6V. If that ADC samples an input signal that varies between 0V and 2.6V, half of the ADCs range is not being used. In contrast, ADC 300 having symmetric DAC 310, in one embodiment, may have a usable range of 0V to 2.6V. Assuming that the ADC with the symmetric DAC and ADC 300 have the same resolution for their respective ranges, ADC 300 may sample the input signal at twice the resolution, and thus may have lesser noise in some instances. In various embodiments, the magnitudes of charges generated by DAC 310 may be selected to achieve a usable range that is optimal for a given application. For example, in some embodiments, DAC 310 may be adapted to generate first and second charges (e.g., positive and negative charges of +400 femtocoulombs and −200 femtocoulombs, in one embodiment) such that the first charge has at least twice the magnitude of the second charge; this selection of magnitudes may produce an optimal range for certain applications. In other embodiments, DAC 310 may be adapted to produce a first charge (e.g., a positive charge) that is at least three times greater than the second charge (e.g., a negative charge) that it produces; this selection of magnitudes produces a different range that may be optimal for other applications. DAC 310 is described in further detail below in conjunction with FIG. 5.

Analog integrator 320, in one embodiment, is a delta-sigma first integrator that is adapted to integrate a charge at node 304. The voltage output of integrator 320 corresponds to charge integrated on a feedback capacitor. In one embodiment, integrator 320 is implemented using an operational amplifier that has a feedback loop that includes one or more metal-oxide-silicon (MOS) capacitors. In various embodiments, the MOS capacitors are constructed from polysilicon and high-capacitance gate oxide, e.g., used for MOS transistors. In some embodiments, these capacitors have a 10× higher capacitance than linear field oxide capacitors; however, MOS capacitors are non-linear.

In one embodiment, to overcome the non-linearity a MOS capacitor (such as MOS capacitor 630 described below in conjunction with FIG. 6) of the same type and with the same signal bias is used on the output of the first integrator 320 to transfer charge to the second integrator 330. In this way, the integrator input charge to output voltage non-linearity from the MOS capacitor feedback is corrected by an opposite voltage to charge non-linearity on the MOS capacitor that transfers charge to the second integrator 330. In addition, both MOS capacitors may be biased unidirectionally (gate turned on) to maintain their high capacitance.

In some embodiments, integrator 320 is adapted to prevent overloading from occurring by adjusting the effective capacitance of the loop based on the strength of the input current received by ADC 300. In one embodiment, if the input current is strong (e.g., between 0.6-8.0 μA, in some embodiments, due to photodiodes receiving a significant amount of light), integrator 320 is adapted to increase the effect capacitance of the loop by coupling capacitors in parallel. If the signal is weaker (e.g., between 0.0-0.6 μA, in some embodiments, due to photodiodes receiving less light), integrator 320 is adapted to decrease the effect capacitance of the loop by using only a single capacitor in the loop. Since the amount of noise produced by capacitors in the feedback loop is dependent on the amount of capacitance (i.e., $Q_n^2 = kTC$, where $Q_n$ is the charge noise, k is Boltzmann's constant, T is temperature, and C is capacitance), integrator 320 may be adapted to adjust noise produced by the capacitors, by changing the effective capacitance of the feedback loop. Analog integrator 320 is described in further detail below in conjunction with FIG. 6.

Analog integrator 330, in one embodiment, is a delta-sigma second integrator that is adapted to integrate a value of a voltage at node 324. In various embodiments, integrator 330 may be configured in a similar manner as integrator 320. In some embodiments, integrator 330 may be adapted to have less gain than integrator 320. Analog integrator 330 is described in further detail below in conjunction with FIG. 7.

Comparator 340, in one embodiment, is a delta-sigma latched comparator that is adapted to compare the output of integrator 330 with a reference voltage ($V_{ref}$) and to produce a value indicating the result of the comparison. In one embodiment, if the reference voltage is greater than the output of integrator 330, comparator 340 is adapted to output a first value (e.g., representative of a logical 1) at node 347. On the other hand, if the reference voltage is less than or equal to the output of integrator 330, comparator 340 is adapted to output a second value (e.g., representative of a logical 0) at node 347. As discussed above, in one embodiment, DAC 310 is adapted to provide a positive or negative charge based on such an output. Comparator 340 is described in further detail below in conjunction with FIG. 8.

Digital integrator 350, in one embodiment, is a digital delta-sigma integrator that is adapted to integrate the output values produced by comparator 340 over a specified integration period. In one embodiment, integrator 350 is adapted to perform the integration by adding each output of comparator 340 to an accumulator. Accordingly, the value in the accumulator is incremented when comparator 340 outputs a logical one, and not adjusted when comparator 340 outputs a logical zero. In one embodiment, integrator 350 is adapted to provide the current value of the accumulator to integrator 360 each time integrator 350 receives an output from comparator 340. At the end of the integration period, integrator 350, in one embodiment, is adapted to reset the accumulator. Digital integrator 350 is described in further detail below in conjunction with FIG. 9.

Digital integrator 360, in one embodiment, is adapted to perform a second integration based on the output of integrator 350 over the specified integration period. To perform the second integration, in one embodiment, integrator 360 is adapted to add each output of integrator 350 to another accumulator. At the end of the integration period, integrator 360, in one embodiment, is adapted to reset the accumulator in conjunction with the resetting of integrator 350's accumulator. In the illustrated embodiment, the output of integrator 360 is provided to register map 230. In some embodiments, the integrator 360 is adapted to store the output in a buffer before providing it to register map 230. In some embodiments in which ADC 300 is not being used for optical sensing, the output of integrator 360 may be coupled to other suitable destinations. Digital integrator 360 is described in further detail below in conjunction with FIG. 10.

As discussed above, in some embodiments, ADC 300 may be used in conjunction with sensor 200. In one embodiment, if sensor 200 is implementing a proximity sensor, ADC 300 may be adapted to improve the performance of the sensor, e.g., by improving range, sensitivity, etc. As will be described in conjunction with FIGS. 13-14, in some embodiments, integrators 350 and 360 may be adapted to use an integration period that improves detection of reflected light by minimizing the presence of noise produced by ambient light.

Figure 4:
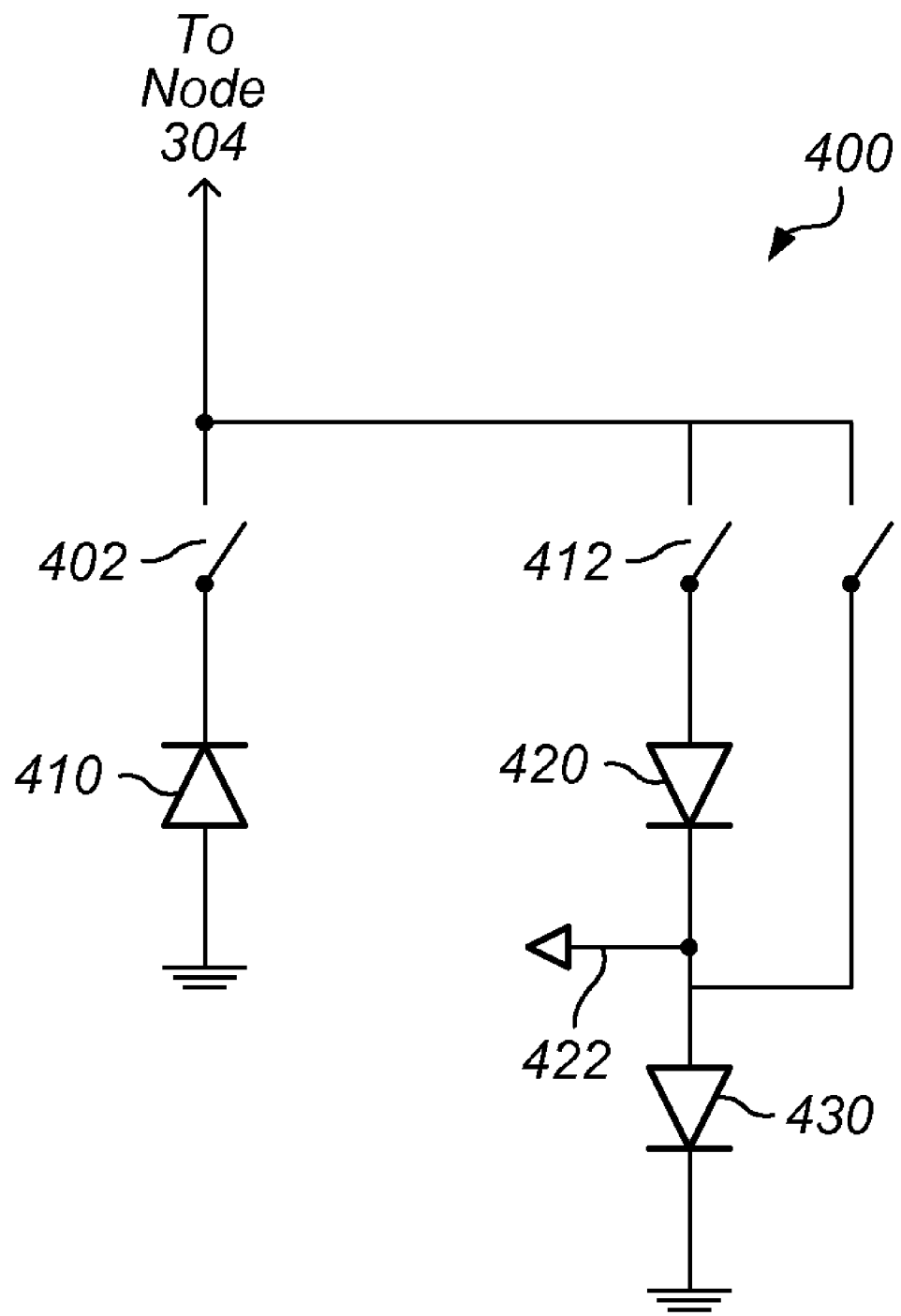
FIG. 4 is a block diagram illustrating one embodiment of a set of photodiodes that may be used by the optical sensor.

Turning now to FIG. 4, a block diagram 400 of photodiodes that may be used by optical sensor 200 is depicted. As shown, diagram 400 includes photodiodes 410-430 and switches 402 and 412. In some embodiments, photodiode 410 corresponds to infrared radiation (IR) photodiode 214, and photodiodes 420 and 430 collectively correspond to visible diode 216. In some embodiments, switches 402 and 412 are implemented within AMUX 218. In the illustrated embodiment, switches 402 and 412 are adapted to couple photodiode 410 and photodiodes 420 and 430 to node 304. (Note that the illustrated embodiment uses no anti-aliasing or input current amplifiers between the photodiodes and ADC 300. This in conjunction with charge measuring may produce a relatively low-noise ADC in some instances.) In some embodiments, an amplifier or other appropriate or desired circuit may be included between photodiodes 410-430 and node 304, albeit at the expense of added noise.

Photodiode 410, in one embodiment, has a strong infrared radiation (IR) response. In the illustrated embodiment, if photodiode 410 is selected, photodiode 410 is adapted to source negative current from node 304 with increasing light. In some embodiments, photodiode 410 is used for proximity detection or measurement. In one embodiment, photodiode 410 may have an infrared optical filter placed above the diode.

Photodiodes 420 and 430, in one embodiment, are stacked to form an ambient-light-sensing (ALS) dual photodiode. In one embodiment, photodiodes 420 and 430 may have a green optical filter to create a response that is closer to a photopic response. In some embodiments, photodiodes 420 and 430 are diffusion devices that have a relatively slow speed (e.g., a response of several hundred nanoseconds). In one embodiment, photodiode 430 has a strong IR response, and is adapted to source negative current with increasing light. In one embodiment, when photodiode 420 is selected, the Nwell in which it resides is biased to a positive voltage, and photodiode 420 outputs a positive current with increasing light.

Figure 5:
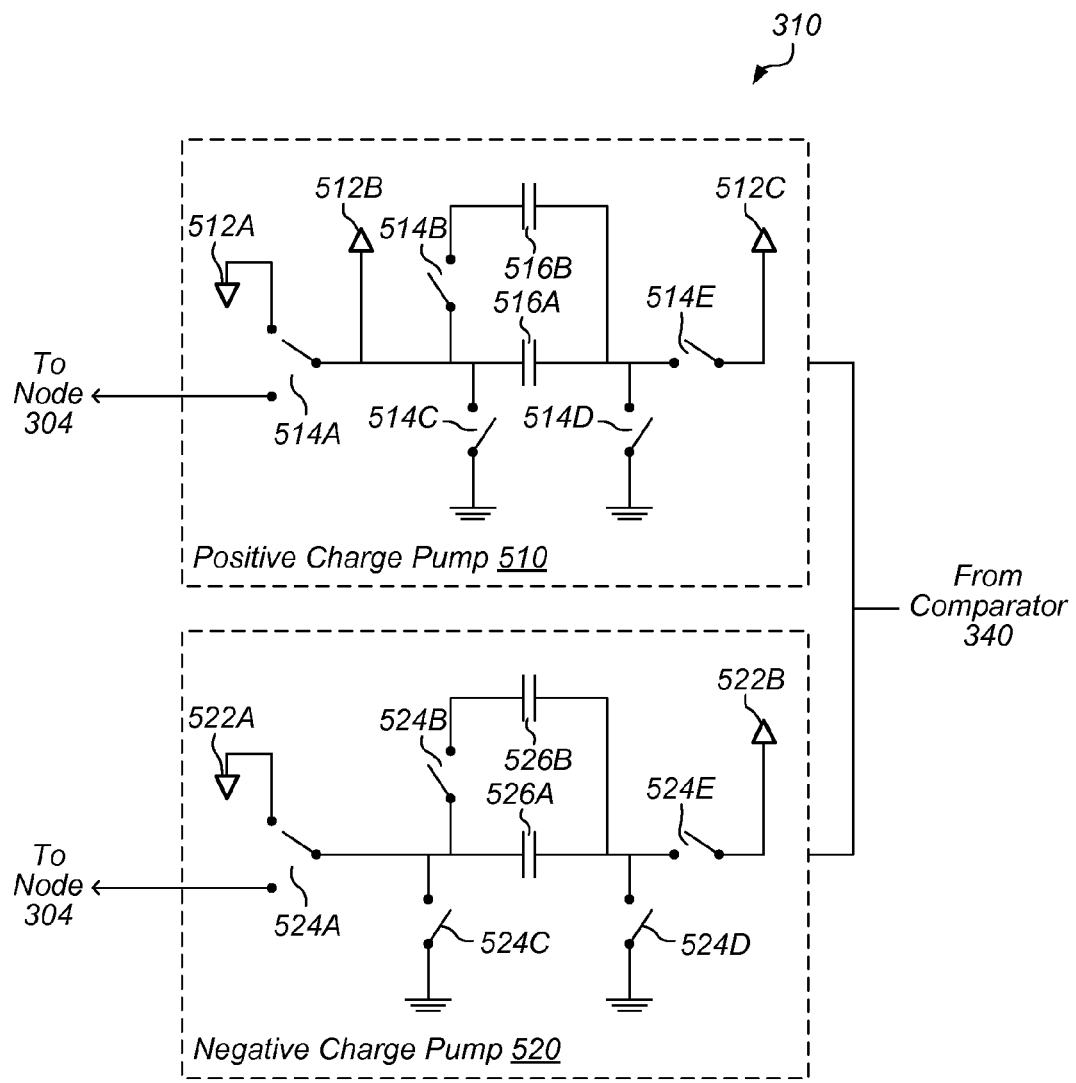
FIG. 5 is a block diagram illustrating one embodiment of a digital-to-analog converter (DAC) that may be included in the ADC.

Turning now to FIG. 5, a block diagram of asymmetric DAC 310 is depicted. As discussed above, DAC 310 is one embodiment of a DAC that is adapted to generate positive and negative charges that are asymmetric. (Charge delivered is the product of capacitance and discharge voltage.) For example, in one embodiment, DAC 310 may produce a negative charge of −224 femtocoulombs by charging 118 femtofarad capacitor with +1.5V relative to ground, and then discharging this charged capacitor by switching the +1.5V side to ground and the other side to the 0.4V input. This then results in a net change of 1.9V across the capacitor and discharges the associated charge (−1.9V×118 femto farads=−224 femtocoulombs) into the input of integrator 310. In one embodiment, DAC 310 may produce a positive charge of 598 femtocoulombs by charging a 230 femto farad capacitor with +1.5V relative to ground and then discharging this charged capacitor by switching the 1.5+ side to the 0.4V integrator input and switching the previously grounded side to +1.5V. This then results in a net change of 2.6V across the 230 femto farad capacitor or 598 femtocoulombs. This is a voltage doubler structure but it does not double the discharge voltage to 1.5V×2 since the capacitor, in one embodiment, is discharged into the 0.4V integrator input rather than 0V. In one embodiment, this results in the positive charge being about three times greater than the negative charge. As will be described below, DAC 310 is adapted to generate asymmetric charges by using a positive charge pump to increase an input voltage and by using a negative charge pump to invert an input voltage. In some instances, DAC 310 has less capacitance, lower noise, and less inaccuracy due to reference-supply pattern-dependent settling, and provides increased useable range on unidirectional photodiode signals (e.g., about one half bit in some embodiments).

By using voltage doubling and asymmetric capacitors for "1" and "0", in various embodiments, lower noise may occur at low signals for the same maximum signal level. Higher signal resolution may also be obtained for the same number of integrator bits over that of a symmetric DAC. In many instances, symmetric DACs waste half the range on unidirectional signals. In one embodiment, with a 1-to-3 asymmetric DAC, with no signal input, the average duty cycle is ¾ "0" and ¼ "1". Since the "0" capacitor may be ½ the size of the "1" capacitor, its noise contribution power may be ½ that of the "1". At larger signals, the percentage of "1"s may increase so that this noise contribution increases; however, since the main signal, in some embodiments, is photodiode current, the shot noise may also increase at a rate faster than the DAC noise-increasing rate. This then allows the DAC to contribute less noise at low signals where the shot noise is low but still accommodate larger signals without loss of resolution due to insufficient bits of resolution. In addition, using the voltage doubler structure, in some embodiments, allows use of smaller capacitors that may be half the size for non-voltage doubler DAC structures. This may also reduce the switch-capacitor-noise power by the same amount. The voltage doubling switching may not add additional noise provided that the voltage source is moderately low noise.

In the illustrated embodiment, DAC 310 includes a positive charge pump 510 and a negative charge pump 520. Positive charge pump 510 includes voltage sources 512A-C, switches 514A-D, and capacitors 516A and 516B. Negative charge pump 520 includes voltage sources 522A and 522B, switches 524A-E, and capacitors 526A and 526B. Charge pumps 510 and 520 and their corresponding structural equivalents may be referred to herein as "a means for providing a first analog output value or a second analog output value."

Positive charge pump 510, in one embodiment, is adapted to generate a positive charge that drives a current from DAC 310 to node 304. In the illustrated embodiment, charge pump 510 is adapted to generate the positive charge, by using voltage source 512B to charge one or both of capacitors 516A and 516B. Once charged, capacitors 516 are then coupled in series with voltage source 512C to produce a higher voltage. In one embodiment, if sources 512B and 512C provide the same voltage (e.g., 1.5 V), coupling capacitors 516 in series with source 512C produces twice the voltage of source 512C (e.g. 3V if driving into "0" volts or 2.6V if driving into "0.4V"). Accordingly, charge pump 510 may be referred to as a "voltage doubler" in some instances.

In one embodiment, positive charge pump 510 is adapted to adjust the amount of capacitance used to generate the positive charge based on the strength of the input current of ADC 300. In one embodiment, if the input current is within a stronger range (e.g., between 0.6-8.0 μA, in one embodiment, due to photodiodes 214 and 216 receiving a significant amount of light), charge pump 510 is adapted to charge both capacitor 516A and 516B in parallel by closing switch 514B. By increasing the effective capacitance, charge pump 510 generates a stronger charge for preventing overloading, but produces greater noise. On the other hand, if the input current is within a weaker range (e.g., between 0.0-0.6 μA, in one embodiment, due to photodiodes 214 and 216 receiving less light), charge pump 510, in one embodiment, is adapted to charge only capacitor 516A by opening switch 514B. By decreasing the effective capacitance, charge pump generates a weaker charge for preventing overloading, but produces less noise. For example, in some embodiments, capacitors 516A and 516B may have capacitances of 15 f and 215 f, respectively. By coupling capacitors 516 in parallel, an effective capacitance of 230 f is created, which increases the amount of produced charge by a multiple of 15. (In some embodiments, if the input current exceeds the high signal range (e.g., 8.0 μA, in one embodiment), ADC 300 maybe adapted to switch to a smaller photodiode to reduce the maximum input signal.)

Negative charge pump 520, in one embodiment, is adapted to generate a negative charge that drives a current to DAC 310 from node 304. In the illustrated embodiment, charge pump 520 is adapted to generate negative charge, by charging one or both of capacitors 526 using voltage source 522B and coupling them to ground using switch 524D. By charging and coupling capacitors 526, charge pump 520 inverts the voltage of source 522B and generates a negative charge. For example, in some embodiments, if source 522B has a voltage of 1.5 V, charge pump 520 is adapted to invert the voltage producing a voltage of −1.5 V, which in series with the 0.4 V of the integrator input results in a net discharge of −1.9 V.

Similar to charge pump 510, charge pump 520, in one embodiment, is adapted to adjust the amount of capacitance used to generate the negative charge based on the strength of the input current of ADC 300. In one embodiment, if the input current is within a stronger range (e.g., due to photodiodes 214 and 216 receiving a significant amount of light), charge pump 520 is adapted to charge both capacitor 526A and 526B in parallel by closing switch 524B. On the other hand, if the input current is within a weaker range (e.g., due to photodiodes 214 and 216 receiving less light), charge pump 520, in one embodiment, is adapted to charge only capacitor 526A by opening switch 524B. In some embodiments, capacitors 526 may have a lesser capacitance than (e.g., half the capacitance of) capacitors 516. In many instances, having a lesser capacitance reduces the average DAC-noise-contribution power directly proportional to the size of the capacitors.

In one embodiment, charge pumps 510 and 520 are adapted to generate their respective charges simultaneously regardless of the output of comparator 340. One of the charges is then selected based on the output of comparator 340, and provided to node 304. For example, in one embodiment, when comparator 340 outputs a logical 1, positive charge pump 510 is adapted to steer its charge into the input path at node 304, and negative charge pump 520 is adapted to steer its charge into, e.g., a dummy load. On the other hand, when the output of comparator 340 is a logical 0, the reverse occurs—i.e., negative charge pump 520 is adapted to steer its charge into the input path at node 304, and positive charge pump 510 is adapted to steer the positive charge into, e.g., a dummy load. By generating both charges in some embodiments, DAC 310 draws a relatively uniform load that is substantially independent of whether it is providing a positive or negative charge. Generating both charges can also allow slower settling from the reference supply. As another advantage, ADC 300, in some embodiments, does not have to make a comparator decision a half-clock earlier to determine whether to generate a positive or negative charge on a single capacitor. The decision where to steer the charge pump outputs, either into the signal input or a load (e.g., a dummy load) can occur immediately or within a relatively short period of time after the delta-sigma comparator makes a decision. This allows longer clock delay through the two integrators, which has some settling benefits, allowing faster settling time (relatively high clock speeds) for a given integrator bias. This may be desirable with an asymmetric DAC where the impedance or capacitor value of the "1" value is different than the "0" value since if the first integrator input does not settle to the previous value, then a significant charge error may occur. In one embodiment, in order to assure that the input stays the same value independent of the integrator output, the input is a two stage or higher integrator which can also take longer to settle. For symmetric DACs, low gain, single stage integrators may be used; the DAC errors arising from input offset dependent on previous history may not cause distortion, only an ADC gain error.

Figure 6:
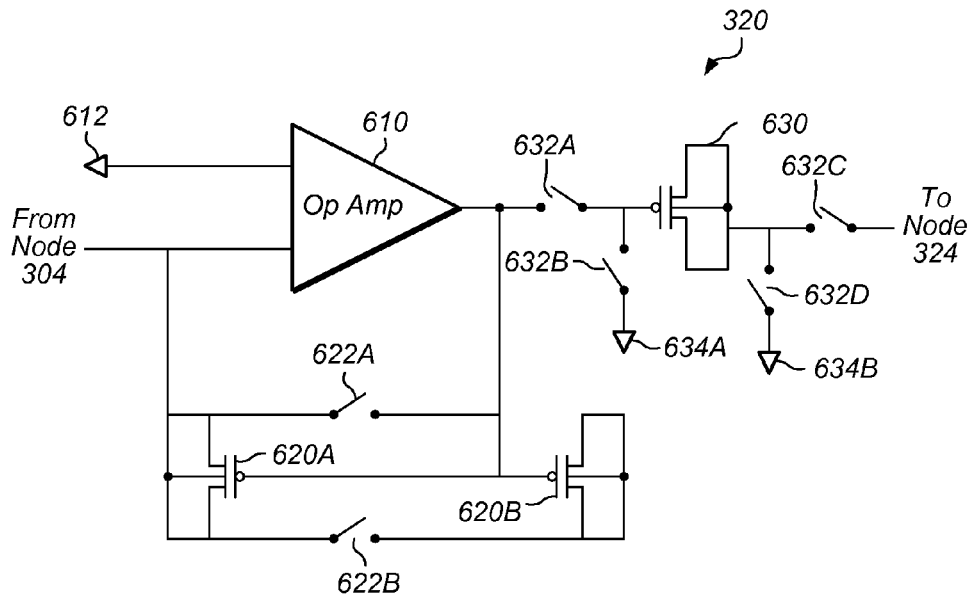
FIG. 6 is a block diagram illustrating one embodiment of a first analog integrator that may be included in the ADC.

Turning now to FIG. 6, a block diagram of analog integrator 320 is shown. As discussed above, analog integrator 320 is one embodiment of a delta-sigma first integrator that is adapted to perform a first integration of a voltage at node 304. In the illustrated embodiment, integrator 320 includes an operational amplifier (Op Amp) 610. Amplifier 610 is coupled to a feedback loop that includes metal-oxide-silicon (MOS) capacitors 620A and 620B, a reset switch 622A, and a selection switch 622B. Amplifier 610 is also coupled to reference voltage source 612. The output of amplifier 610 is coupled to another MOS capacitor 630, which, in turn, is coupled to switches 632A-D and voltage sources 634A and 634B.

Amplifier 610, in one embodiment, is adapted to amplify the voltage difference between the voltage at node 304 and the voltage provided by source 612. In one embodiment, reset switch 622A is adapted to reset amplifier 610 at the beginning of an integration period by coupling the input and output of amplifier 610. In the illustrated embodiment, MOS capacitor 630 is coupled to the output of amplifier 610 to cancel or substantially cancel distortion created by capacitors 620. In one embodiment, capacitor 630 is identical or substantially identical to MOS capacitors 620, and is adapted to have the same bias voltage as capacitors 620.

In some embodiments, integrator 320 is adapted to change the effective capacitance of the feedback loop based on the input current of ADC 300, (or the gain of DAC 310, which is dependent upon the input current, in some embodiments). In the illustrated embodiment, integrator 320 is adapted to change the effective capacitance by using selection switch 622A. In one embodiment, if the input current is within a weaker range (e.g., 0.0-0.6 µA in one embodiment), integrator 320 is adapted to decrease the effective capacitance of the feedback loop by opening switch 622B and using only capacitor 620A. If the input current is within a stronger range (e.g., 0.6-8.0 µA, in one embodiment), integrator 320 is adapted to increase the effective capacitance of the loop by closing switch 622B and using both capacitors 620A and 620B in parallel. By changing the effective capacitance of the feedback loop in this manner, integrator 320, in some embodiments, adjusts the noise produced by the feedback loop while preventing overloading of integrator 320.

In one embodiment, integrator 320 uses a medium threshold NMOS on a single-ended input (as opposed to a differential input) which has an input threshold of, say, 0.4V. It functions as a relatively low noise input with the positive input referenced (from an AC signal perspective) to Vss or ground potential with a DC offset equal to the NMOS gate threshold. Because the input is not a differential transistor pair in the illustrated embodiment, but uses a single transistor, it exhibits lower noise levels and better headroom, and has faster gain bandwidth for the same bias current, thus making a high gain, multi-stage integrator easier to stabilize.

Although balanced differential inputs are considered to provide high noise rejection, they do so if the signal input source has both a balanced impedance to ground and balanced pickup of noise. The input is the most sensitive part of the system, where noise immunity is desirable. However, photodiodes are inherently single ended or asymmetric both in impedance and electrostatic noise pickup. The integrated photodiode on a grounded substrate has relatively high electrostatic noise immunity, say, 30 dB-40 dB better than an external photodiode, due to the shielding of the substrate and its relatively small active "antenna" area. Thus, a small integrated photodiode can be not only cheaper (if less than one third the area) but also outperform an external photodiode. Consequently, a single ended amplifier structure for the first integrator in a photo ADC delta-sigma application may achieve better noise performance with less power compared, with a differential structure when receiving an input signal from an integrated photodiode. In addition, the single ended amplifier structure generally is simpler and higher performing in relatively low voltage applications, say, under 1.5V, than low voltage folded cascode structures. In some embodiments, integrator 320 may use differential input circuitry, depending on considerations such as the desired performance and application, etc.

Because the DAC impedance is asymmetric, integrator 320 may have a relatively fast-settling, high-voltage, high-transconductance gain, so that there is relatively low data-dependent offset on the input which would otherwise modulate the charge input. A conventional single stage cascade amplifier fails to achieve sufficient integrator gain or gain bandwidth typically desired.

Figure 7:
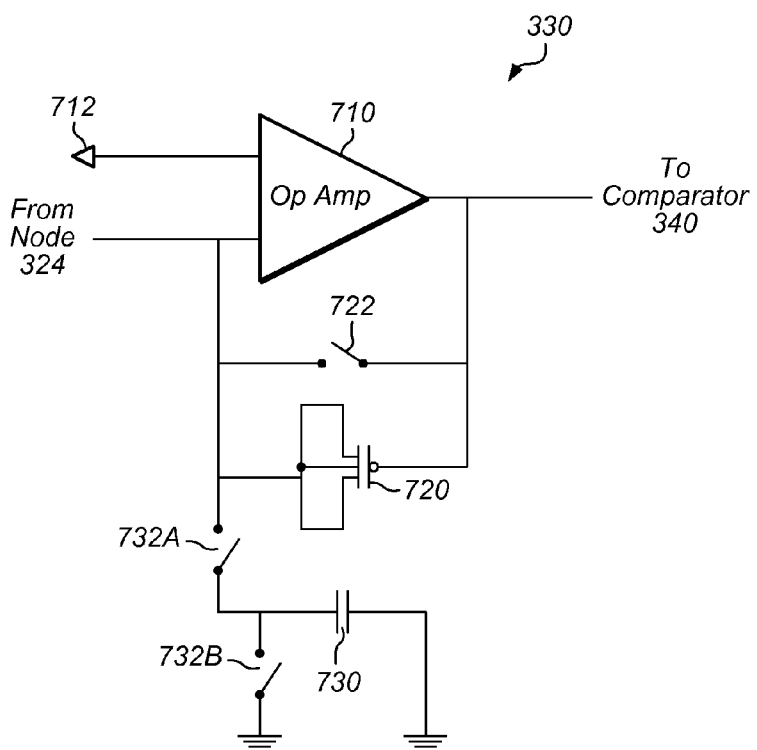
FIG. 7 is a block diagram illustrating one embodiment of a second analog integrator that may be included in the ADC.

Turning now to FIG. 7, a block diagram of analog integrator 330 is shown. As discussed above, analog integrator 330 is one embodiment of a delta-sigma second integrator that is adapted to perform a second integration of a voltage at node 324. In the illustrated embodiment, integrator 330 includes an operational amplifier 710 that is coupled to a voltage source 712 and a feedback loop. The feedback loop includes MOS capacitor 720 and a reset switch 722. In one embodiment, amplifier 710 is adapted to have less amplifier gain than amplifier 610 described above. In one embodiment, MOS capacitor 720 has smaller capacitance than capacitors 620. In the illustrated embodiment, amplifier 710 is also coupled to a capacitor 730, which, in turn, is coupled to switches 732A and 732B. In one embodiment, integrator 330 is adapted to shift the input voltage of amplifier 710 to a center value by using capacitor 730.

In one embodiment, MOS capacitor 720, due to its very thin gate oxide, is smaller in area than a more-linear field oxide capacitor. Linearity correction may not be used when using a MOS capacitor on the second integrator 330 since the output decision may happen at the same voltage. The linearity of the feedback capacitor on the integrator may have no effect on the total charge input plus or minus. In other words, it may take the same negative charge input as the previous charge input to return the integrator value back to the same comparator switching voltage. In one embodiment, the second integrator feedback capacitor 720 has sufficient capacitance in both directions to prevent overload before the delta sigma feedback has to time to correct. Capacitor 720 may also use shifted biasing since MOS capacitors have a unidirectional bias voltage to maintain high capacitance unlike field oxide capacitors which may have plus or minus voltage.

Turning now to FIG. 8, a block diagram of comparator 340 is shown. As discussed above, in one embodiment, comparator 340 is a delta-sigma latched comparator that is adapted to compare the output of integrator 330 with a reference voltage ($V_{ref}$). In the illustrated embodiment, the reference voltage is provided by voltage source 802. The input of comparator 340 is also coupled to over-range (OVR) detector 810. OVR detector 810 includes elements 820 and a latch 830. Elements 820A and 820B are coupled to respective voltage sources 822A and 822B.

In one embodiment, OVR detector 810 is adapted to detect if the output of integrator 330 is about to saturate, which occurs if the delta-sigma loop cannot drive the input signal to zero. If such an event occurs, digital integrators 350 and 360 may not accurately reflect the signal input value. In one embodiment, detector 810 is adapted to latch any analog over range that occurs on integrator 330. In some embodiments, detector 810 may be double buffered such that the output latch holds the previous measurement value until a new measurement is finished.

Turning now to FIG. 9, a block diagram of digital integrator 350 is depicted. As discussed above, in one embodiment, digital integrator 350 is adapted to integrate the output values produced by comparator 340 over a specified integration period. In the illustrated embodiment, integrator 350 includes an accumulator 910 that receives a clock signal 912 and a reset signal 914.

Accumulator 910, in one embodiment, is adapted to calculate the number of times comparator 340 outputs a logical 1 (referred to as a count) over a specified integration period. In one embodiment, accumulator 910 is adapted to add the current output of comparator 340 to a running total value in response to a rising edge of clock signal 910.

In one embodiment, accumulator 910 may be adapted to store a maximum of 512 counts (9-bit value) and receive a 20 MHz clock signal.

In one embodiment, integrator 350 is adapted to reset accumulator 910 at the end (or beginning) of an integration period in response to receiving reset signal 914. As will be described below in FIGS. 14A and 14B, the integration period, in one embodiment, may be 25.6 µs spanning 512 outputs of comparator 340. In other embodiments, other integration periods and count values may be used. In some embodiments, the integration period and count value may be specified by a user, e.g., via a programmable value. In some embodiments, the integration period may be increased or decreased based on the strength of the input received by ADC 300 (e.g., due to a photodiode receiving more or less light).

Turning now to FIG. 10, a block diagram of digital integrator 360 is depicted. As discussed above, in one embodiment, digital integrator 360 is adapted to perform a second integration based on the output of integrator 350 over the specified integration period. In the illustrated embodiment, integrator 360 includes an accumulator 1010 that receives a clock signal 1012 and a reset signal 1014.

Accumulator 1010, in one embodiment, is adapted to add the value stored in accumulator 910 to a stored running total. In one embodiment, accumulator 1010 adds a value for each clock cycle of clock signal 1012 over the specified integration period. In one embodiment, accumulator 1010 may be adapted to store up to 17-bit value and receive a 20 MHz clock signal. In one embodiment, integrator 360 is adapted to reset accumulator 1010 at the end (or beginning) of an integration period in response to receiving reset signal 1014. In one embodiment, accumulator 1010 is adapted to provide the current total to a storage buffer at the end of the integration period.

Figure 11:
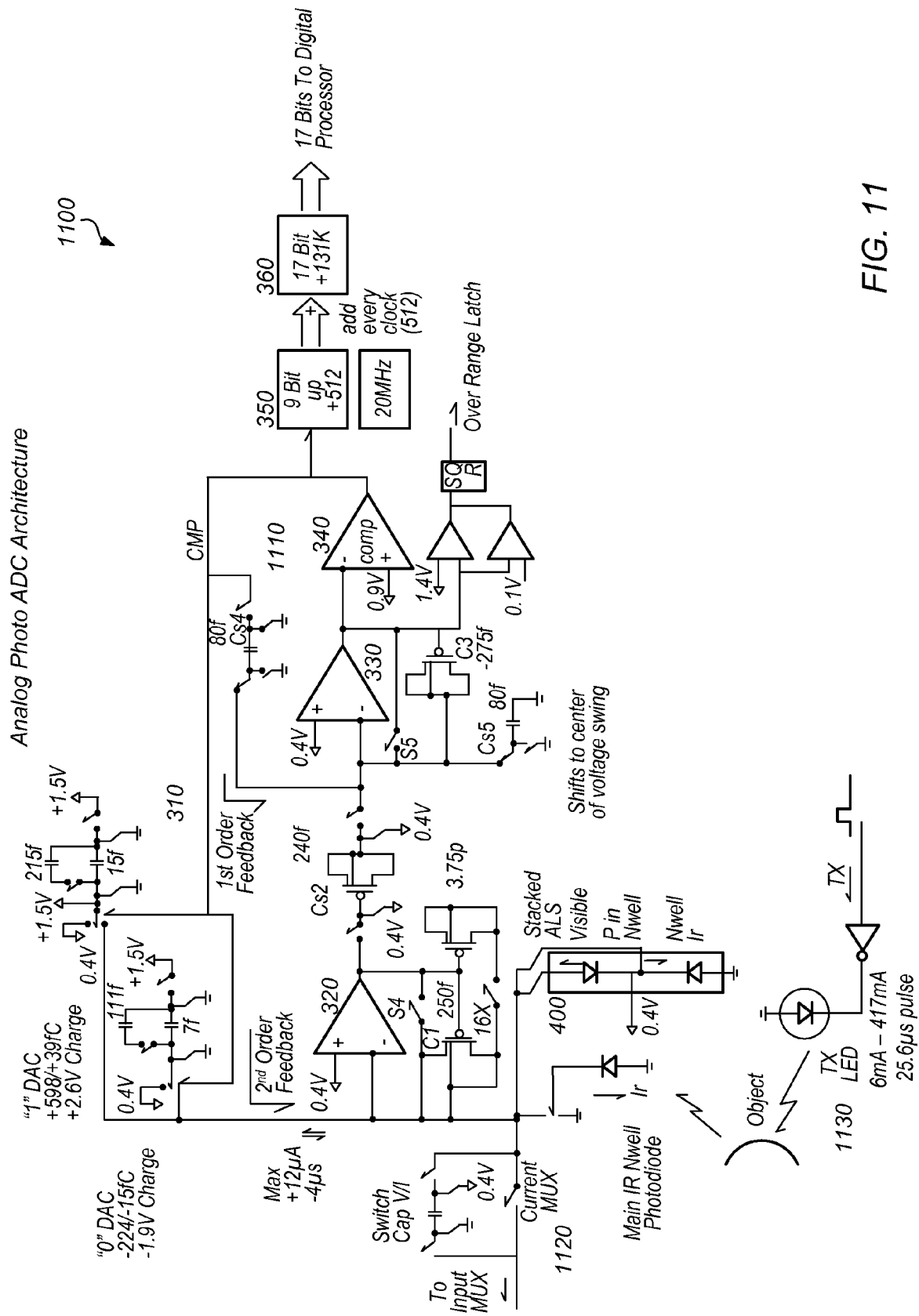
FIG. 11 is a block diagram illustrating one embodiment of the ADC.

Turning now to FIG. 11, a block diagram 1100 of one embodiment of ADC 300 is depicted. In the illustrated embodiment, diagram 1100 includes specific values for various structures described above. In other embodiments, other suitable values may be used. In the illustrated embodiment, diagram 1100 also includes a switched capacitor network 1110, switched capacitor network 1120, and LED unit 1130.

Switched capacitor network 1110, in one embodiment, is adapted to provide a first-order feedback path, which facilitates delta-sigma loop stability.

Switched capacitor network 1120, in one embodiment, is configured as a voltage input and the bypass path for an external current source. In one embodiment, network 1120, combined with a secondary input MUX, allows ADC 300 to be reused with a relatively small amount of additional circuitry for other functions, such as relatively accurate voltage, current, and resistor measurements on both internal and external devices. For example, in one embodiment, ADC 300 can measure in voltage mode, by selecting the appropriate MUXs, the internal temperature reference, the Vdd supply voltage, or an external voltage presented on an unused IO pin. In one embodiment, if ADC 300 is in current mode and appropriate MUX are set, it may measure the current from an external photodiode for an auxiliary photo processing application, or it may measure a resistor allowing a determination of its value which may be used for setting a firmware controlled parameter, as desired.

LED unit 1130, in the illustrated embodiment, includes an LED and a driver illuminating an object, the reflection of which is measured by a sequence of measurement cycles.

Figure 12:
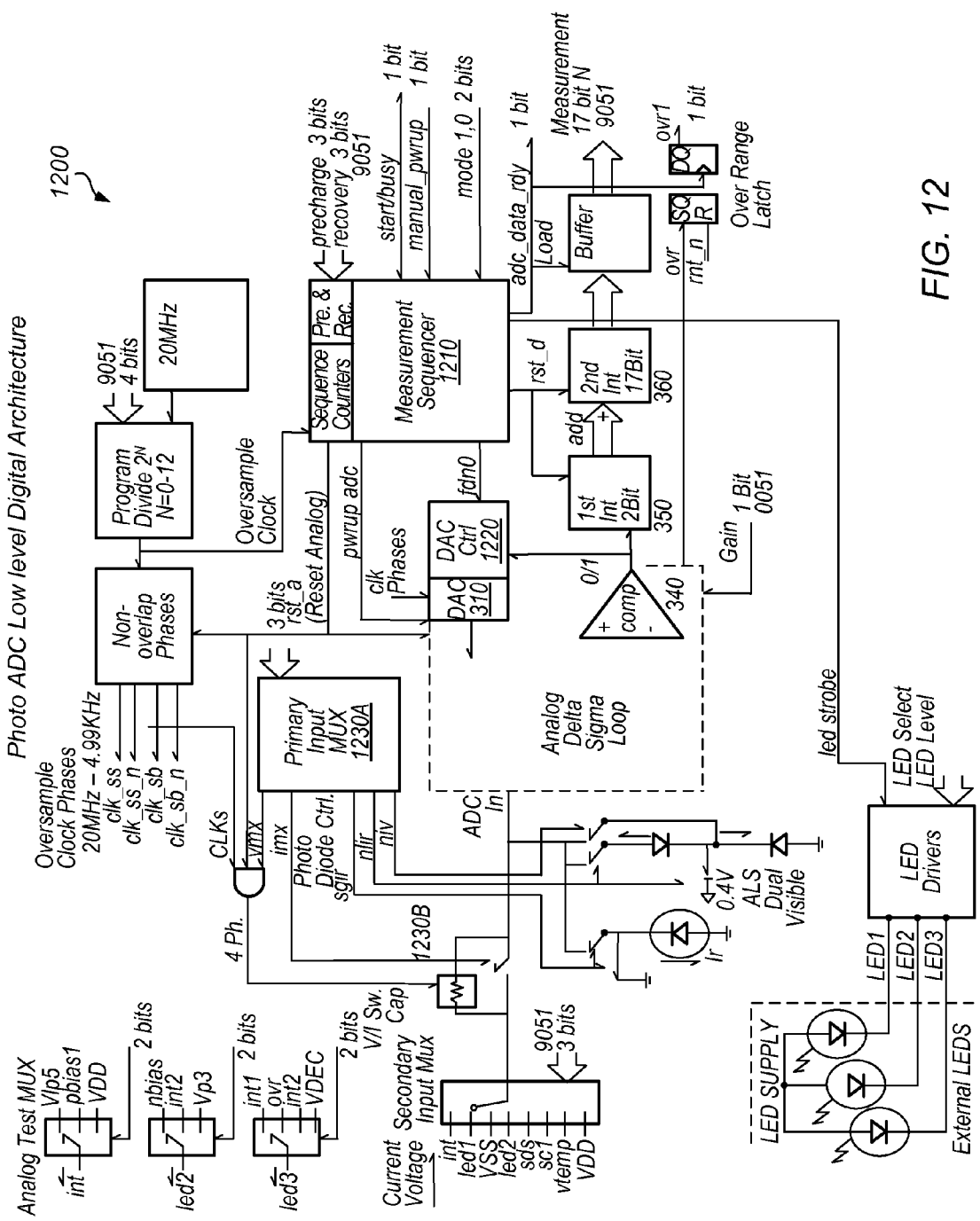
FIG. 12 is a block diagram illustrating control structures for one embodiment of the ADC.

Turning now to FIG. 12, a block diagram 1200 illustrating control structures for one embodiment of ADC 300 is depicted. In the illustrated embodiment, diagram includes measurement sequencer 1210, DAC control unit 1220, and input muxes 1230A and 1230B. In other embodiments, ADC 300 may be configured differently than shown.

Measurement sequencer 1210, in one embodiment, includes control logic that is adapted to implement a state machine, with a set of counters and various logic circuitry. In one embodiment, sequence 1210 is adapted to perform the control sequence shown in the timing diagrams described below in conjunction with in FIGS. 13-14. In some embodiments, sequencer 1210 may communicate using the following control signals:

adc_data_rdy—This is an output asserted when data is ready at the end of the conversion cycle. It is reset when the data are read.

ovrl—ovr latched, an output indicating integrator 330 over ranged at some point during the measurement. It is a latched and reset when read.

adc_ga—ADC gain control, selects one of two DAC gain values. This bypasses the measurement sequencer and couples to the analog delta-sigma portion of ADC 300.

manual_pwrup—Continuously powers up analog portion of ADC 300 when asserted by forcing pwrup_adc (see below). In the embodiment shown, the ADC sequencer powers up the analog section automatically.

mode 1, mode 0—Defines 1 of 3 measurement sequences—single, single calibration proximity, or dual calibration proximity.

start/busy—Asserted to start measurement, stays high during measurement (busy), and a low level indicates that the ADC is available to start another measurement.

In one embodiment, measurement sequencer 1210 is adapted to receive the over-sample clock signal, called clk_adc, from Program Divide 2N, which in turn receives a system 20 MHz clock. The Program Divide may allow the option of reducing the frequency of the ADC clock signal in order to increase the integration period and hence increase the sensitivity of ADC 300, as described above.

In one embodiment, with the over-sampled clock signal and the command inputs above, measurement sequencer 1210 controls the following blocks: the analog Delta-sigma, DAC 310, digital integrators 350 and 360, the data output buffer, and the OVR buffer 810. To control these blocks, measurement sequencer 1210, in some embodiments, uses the following control lines:

pwrup_adc—controls ADC power;

fdac0—forces DAC 310 to 0 state, used for photodiode pre-charge;

rst_a—analog reset, which resets both analog integrators 320 and 330; de-assertion of this signal enables DAC 310 and starts the analog delta-sigma loop measurement;

ovr—asserted when the second analog integrator 330 output is close to saturating in either polarity;

dac_out—delta-sigma comparator output that controls both DAC 310 and first digital integrator 350 up count;

led_strobe—enables the LED drivers for the proximity portion of the measurement cycle;

pre_cnt—3 bits define 1 to 64 ADC clocks of pre-charge duration; and rec_cnt—3 bits define 1 to 512 ADC clocks of delay adjustable in powers of 2 before a measurement for settling recovery from the previous measurement.

DAC control unit 1220, in one embodiment, includes logic that is adapted to coordinate operation of DAC 310 based on the output of comparator 340. In one embodiment, control unit 1220 is adapted to control the DAC positive or negative charge on each pulse, depending on whether the comparator output is a logical 0 or 1 and if fdac0 is asserted.

Primary Input MUX 1230A, in one embodiment, provides logic control for the primary input multiplexing, where either 1 of the 3 photodiodes, no input, external current input, or voltage input is determined as a function of control inputs from the main controller logic (or circuitry at higher levels of control logic hierarchy).

Secondary Input MUX 1230B, in one embodiment, provides logic and switches to connect both internal and external signals to Primary Input MUX 1230A.

Figure 13:
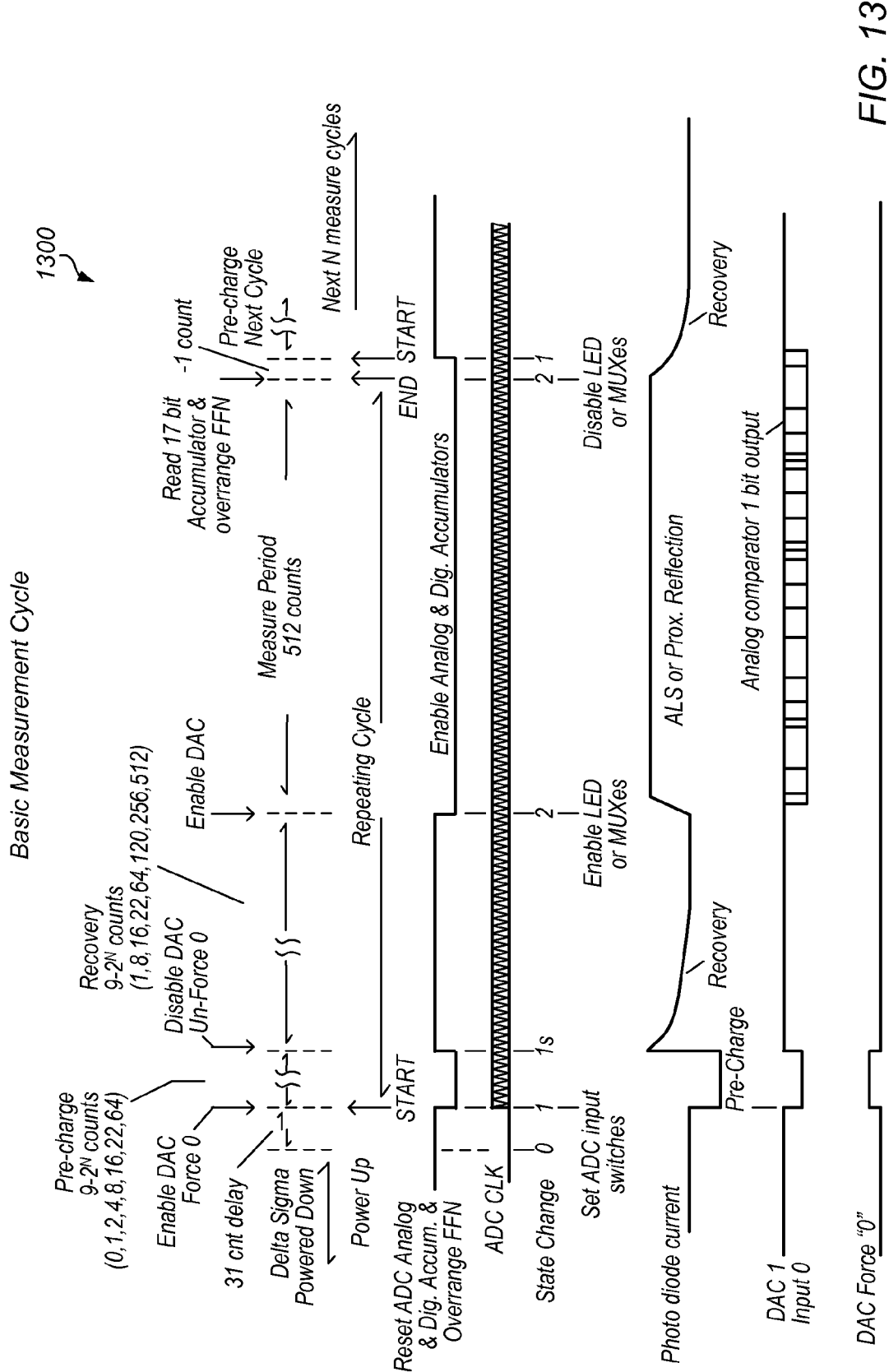
FIG. 13 is a timing diagram illustrating one embodiment of a measurement cycle using the ADC.

Turning now to FIG. 13, a timing diagram 1300 illustrating one embodiment of a measurement cycle is depicted. In some embodiments, ADC 300 may be adapted to use timing parameters specified by diagram 1300 if ADC 300 is adapted to measure light received by a photodiode. In other embodiments, ADC 300 may be adapted to use different timing parameters.

In one embodiment, when ADC 300 is to make a measurement, it powers up and then waits 31 clocks for biases to settle and stabilize. In some embodiments, system firmware can also manually power up the ADC, as desired.

After the power up delay, system 100, in one embodiment, configures the signal input to whatever photodiode or voltage or current input that is to be measured. Then, ADC 300, in one embodiment, starts the pre-charge period. In the pre-charge period, the analog reset, in one embodiment, is released (e.g., using switches 622A and 722), and DAC 310 is forced to the 0 state, which causes it to pump negative current into the photodiode to forward bias it, so as to pre-charge photodiode minority carrier traps, thus causing low level non-linearity in the photodiode response. In some embodiments, this pre-charge period is programmable.

In one embodiment, following the pre-charge, the analog reset signal is asserted, and the DAC forced 0 state is released, thus starting the programmable duration recovery period. The recovery period allows the photodiode to recover from the minority carriers pulse tail decay of the pre-charge (or the previous LED reflectance or previous ADC measurement). Note that the recovery period settling prevents errors between the first measurement and subsequent measurements because of previous events.

In one embodiment, at the end of the recovery period, the measurement period starts with the release of both the analog reset on the integrators and release of reset on the digital integrators 350 and 360. In one embodiment, after 512 counts the measurement ends and the digital integrator 360 is read into the output buffer and ADC data ready bit is set. In one embodiment, the sequence then powers down, or continues with the next measurement cycle again, as desired.

In some embodiments, a calibration measurement may be made prior to performing one or more measurements. In one embodiment, the calibration is an ADC measurement cycle with all inputs off. This ADC calibration may measure the residual offset or zero value of the ADC, which, in one embodiment, is about one quarter of the full scale $2^{17}$, or about $2^{15}$. In one embodiment, this calibration value is subtracted from the measurements. Note that, typically, it does not matter where in a sequence of measurements the calibration is made. Furthermore, note that in some embodiments, the calibration has relatively small temperature drift, for example, about ten counts per degree Celsius. Consequently, in some embodiments, one may perform the calibration relatively infrequently, if convenient or desired.

Figure 14A:
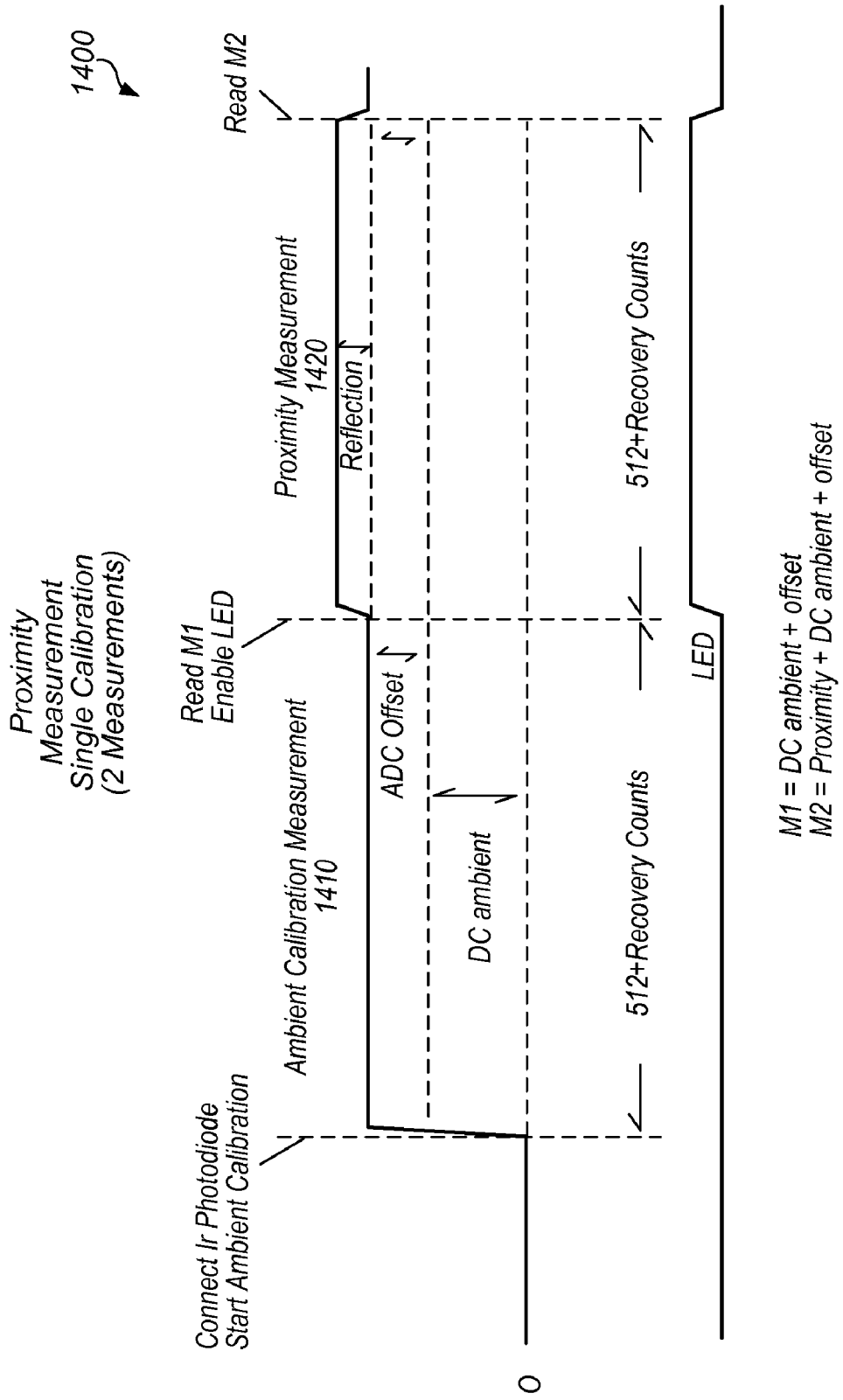
FIG. 14A is a timing diagram illustrating one embodiment of a single-calibration proximity sequence using the ADC.

Turning now to FIG. 14A, a timing diagram 1400 illustrating one embodiment of a single calibration proximity sequence is depicted. As discussed above, in some embodiments, system 100 may be adapted to implement a proximity-sensing device that is adapted to measure an amount of light reflected from an object, where an LED light source provides the light. In one embodiment, system 100 is adapted to determine an amount of reflected light by taking a first measurement that samples ambient light without turning on the LED. System 100 may then take a second measurement that samples both the ambient light and light produced by the LED. System 100 may then subtract the first measurement from the second measurement to determine the amount of reflected. In such embodiments, ADC 300 may be adapted to use timing parameters specified by diagram 1400 for a single-calibration proximity sequence.

In the illustrated embodiment, diagram 1400 shows DC 300 performing an ambient calibration cycle 1410 (i.e., ADC 300 samples a current created by the photodiode in response to ambient light) and then performing a proximity cycle 1420 (i.e., ADC 300 samples a current created by the photodiode in response to ambient light and reflected light produced by the LED light source). In one embodiment, the input of ADC 300 stays on the same photodiode input or multiplexed input. With this proximity sequence, the calibration reading includes both the ADC offset and the ambient level (which represents the background light level), while the proximity measurement includes the ADC offset, plus the ambient level and the proximity reflection. In one embodiment, system 100 reads both values and subtracts the ambient calibration from the proximity measurement to determine the actual reflection component from the strobed LED.

In the illustrated embodiment, each measurement uses an integration period of 25.6 μs, which spans 512 counts. (In other embodiments, other integration periods may be used.) In some instances, a 25.6 μs integration period may be relatively optimal, being at least one cycle of a fluorescent light inverter period. Although fluorescent lights output about 1-10% of the visible light in infrared, a relatively thin integrated infrared filter over the silicon signal diode may allow up to 11% of the visible infrared noise to pass. Compact fluorescent inverters (CFLs) or electronic ballasts may range from 30 KHz to 60 KHz, while long tube fluorescent electronic ballasts may operate as low as 20 KHz. These inverters typically produce triangle optical waveforms that are folded to twice the inverter frequency. Unsynchronized, a measurement pulse that is at least the width of one half cycle of the electronic ballast inverter will generally reduce the integrated noise to less than one fifth of the peak to peak value.

The relatively short 25.6 μs time difference between calibration and proximity measurement provides relatively high immunity to flicker and sunlight flutter due to the relatively low rate of change of both of these light noise sources. Instead of integrating for a relatively large number of cycles of flicker noise, ADC 300, in one embodiment, employs a relatively small measurement period, which may be less than 1% of the noise period. This method works for both flicker and sunlight flutter since both have relatively low higher frequency components relative to their fundamentals. For example, with flicker noise, the maximum rate of change occurs on the center slope of the 120 Hz cycle and is about 1.25% of the peak to peak value over a 25.6 μs interval or about 0.125% of the average value. With a 400 Lux incandescent and a 25.6 μs period, the flicker noise would cause 288 pA, an eighty fold improvement, over 23 nA for a longer 5 ms period (100 Hz bandwidth), and about a 8 fold improvement over a 50 ms integration period.

Due to the shorter integration period of 25.6 μs, or equivalent higher bandwidth of 20 KHz, the integrated shot noise may be higher, in some embodiments, at 38 pA than the 2.7 pa in the 100 Hz bandwidth example. But this is still lower than the already 80 fold reduced flicker noise at 288 pA. In this example, the flicker noise can be reduced by another 80 fold by using the dual calibration proximity sequence, which determines the slope of the ambient. Of course, one may continue to add ambient calibration measurements to determine the slope of the slope, etc. In effect, one may apply Taylor polynomial expansion to flicker noise prediction. Typically, this process involves no more than two calibration periods (described below in conjunction with FIG. 14B) to push the flicker or sunlight flutter below the shot noise floor although, in various embodiments, one may use other numbers of calibration periods. Note that the dual calibration mode adds about 8 dB of noise over a single calibration. In some embodiments, the dual calibration mode is not used unless it provides a relatively significant improvement for flicker and flutter noise (e.g., more than 8 dB).

In some embodiments, it is possible to further improve the ADC resolution signal-to-noise by repetitively integrating a relatively long series of relatively short calibration and proximity cycles. For example, in one embodiment, making about 1,300 measurement cycles of two calibration periods and one proximity over 100 ms and digitally integrating the results improves the resolution by the square root of the number of measurement cycles, or about 36 fold (another 5 bits of resolution). Since the single cycle signal-to-noise resolution is 15 bits, this technique increases signal-to-noise resolution to 20 bit by using relatively simple digital integration. The improvement in this example is comparable to what one may achieve with two relatively long 50 ms integration measurement periods, assuming the absence of flicker or flutter noise and also assuming the ADC converter has 20 bits of resolution. The 20-bit resolution over the 50 ms integration measurement period for a first-order delta-sigma ADC difficulties achievable, using a 20 MHz clock. However, the flicker and flutter noise still pose problems. Furthermore, note that reducing the pulse width on a first-order delta system to reduce power or reduce measurement period degrades range.

In some embodiments, for lower light conditions, the clock signal of the second-order proximity ADC system may be reduced in order to extend the total integration time. This may be warranted when the lowest bits of the 17 bit, in one embodiment, delta-sigma converters are not noisy, suggesting that both shot and other noise sources are below the minimum ADC resolution. By extending the integration period (by slowing the clock), more total light is gathered, but the charge steps remain the same. Typically, the 25.6 μs integration period might be extended by, say, up to 256 times, or to 6.55 ms. This gives a linear increase in signal-to-noise with increasing integration time, rather than a square root increase, if the noise is less than the ADC minimum resolution. Once the noise exceeds the minimum resolution, as the pulse width is increased, the integrated signal-to-noise will increase with the square root of the period. Note that widening the LED period increases total power but, beyond a range of, say, several meters, the measurement period can be typically ten times longer, on the order of 500 ms or more, since at these ranges the application is usually to detect body or object bulk motion, rather than, for example, faster hand commands.

Although the ADC integration period per measurement, in some embodiments, may be 512 counts, which in the second-order delta-sigma converters may provide a 217-count range, shorter or longer count integration periods can be used by using a programmable counter, as desired, to replace the fixed 512 counter, which controls the integration period. This allows either higher sampling rate due to shorter measurement periods with reduced resolution, or slower sampling rates with higher resolution, as desired.

In some embodiments, shorter ADC integration periods may be useful for one-way IR remote applications, which operate with carriers in the 30 KHz to 60 KHz range. Sampling these above their Nyquist rate and filtering them appropriately may entail a minimum measurement sampling rate of 60 KHz to 120 KHz, or a maximum sampling period of 16.7 µs to 8.33 µs. In one embodiment, this can be achieved by over sampling clock rate of 20 MHz and reducing the 512 counts during the integration period to 334 or 167 counts. The digital integrator structure may remain the same. In one embodiment, the resolution is proportional to ½ of the square of the integration count. For example, with a 167-count integration period, the output range, in one embodiment, may span 13,944 counts, or somewhat less than 14 bits. By digitizing the input signal, digital filtering and signal processing become possible, which facilitates optimizing the performance of one-way IR remote receivers with relatively high sensitivity.

Figure 14B:
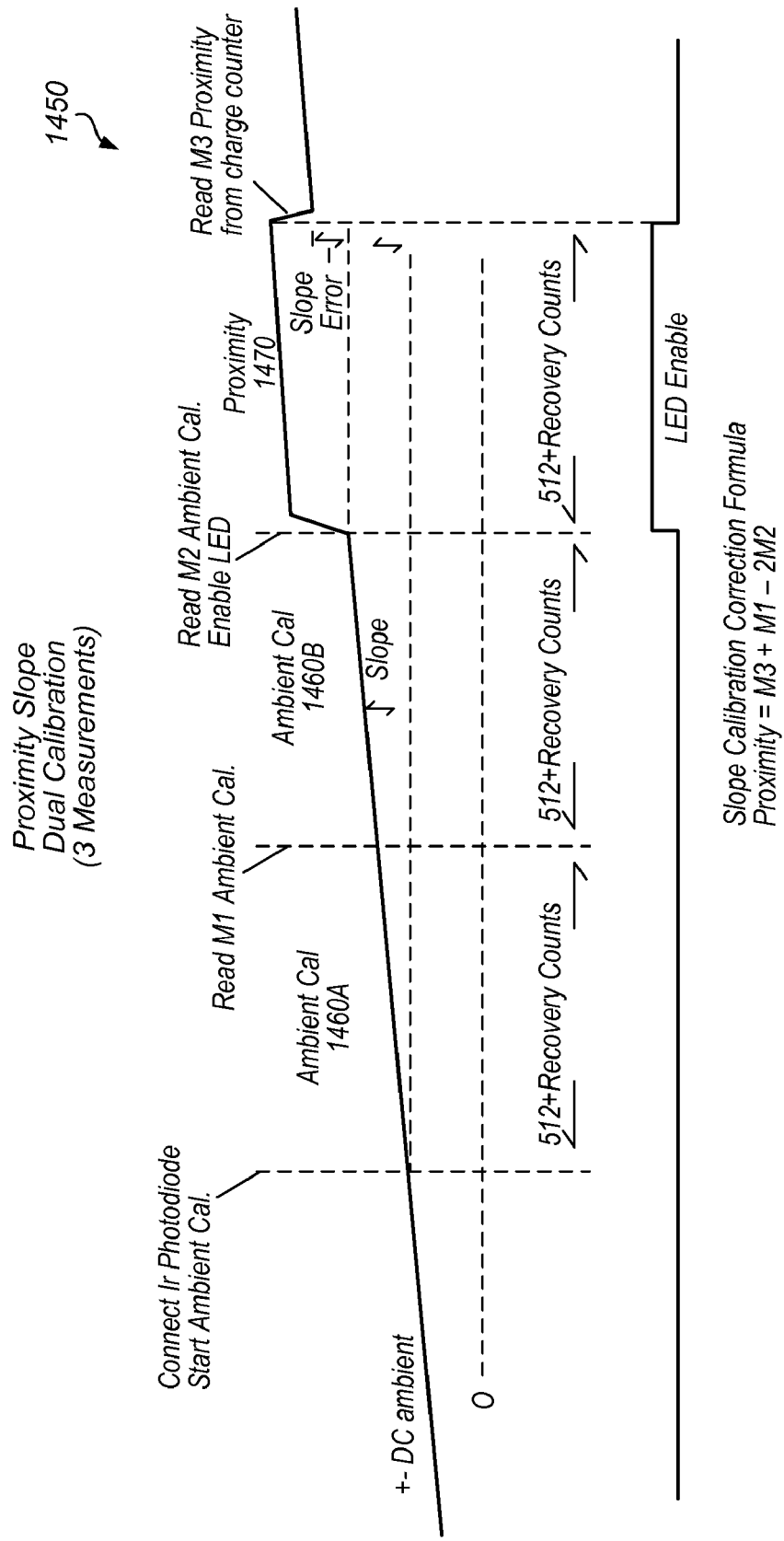
FIG. 14B is a timing diagram illustrating one embodiment of a dual-calibration proximity sequence using the ADC.

Turning now to FIG. 14B, a timing diagram 1450 illustrating one embodiment of a dual-calibration proximity sequence is depicted. In the illustrated embodiment, diagram 1450 shows a first calibration cycle 1460A, a second calibration cycle 1460B, and a proximity cycle 1470. In one embodiment, the proximity measurement dual calibration sequence, which is similar to the single calibration sequence shown in diagram 1400, except that an additional calibration cycle 1460B is added. In one embodiment, this calibration measurement may be identical to the first one. Again, note that the three cycles differ in that during the last proximity cycle the LED strobe is enabled. With two ambient calibration cycle measurements, system 100, in one embodiment, is adapted to measure the slope of the ambient change to more accurately predict its value during proximity. To calculate the correct proximity, system 100 may use the formula P=M3+M1−2M2, where P is the proximity reflectance corrected for ambient and ADC offset, M1 is the first calibration, M2 is the second calibration, and M3 is the strobed LED measurement. Generally, this dual calibration proximity may be used in environments that have relatively high levels of ambient flicker, flutter, or both.

Although for both proximity sequences the LED strobe is shown as the last event, in some embodiments, proximity sequences may be at the beginning or between the dual calibration values, as desired. Accordingly, the slope correction formula may change if the sequence is different for the dual calibration sequence. It is typically desirable to both minimize and keep uniform the delay between calibration and proximity measurement in order to accurately cancel the changing ambient. This is a reason that, in one embodiment, an ADC digital controller may have control over the sequence in order to remove firmware dependent timing and to reduce firmware overhead. In some embodiments, system 100 may duplicate the proximity measurements by doing two or three single measurements sequentially and controlling the LED.

Figure 15:
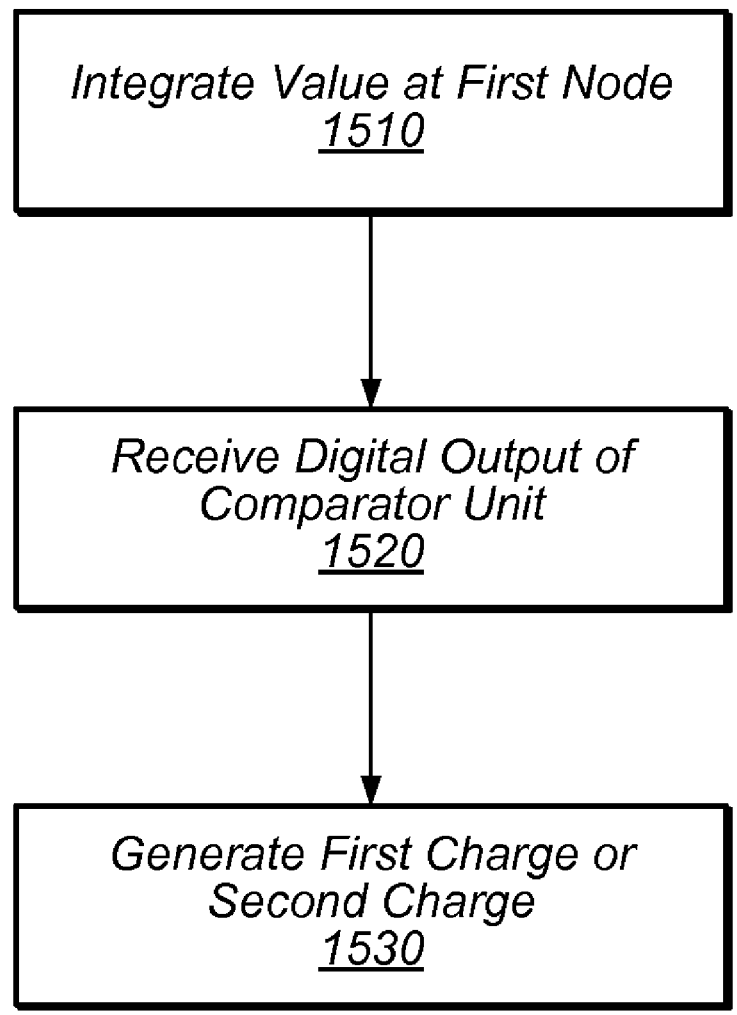
FIG. 15 is a flow diagram illustrating one embodiment of a method performed by the ADC.

Turning now to FIG. 15, a method 1500 is depicted. Method 1500 is one embodiment of a method that may be performed by ADC 300 to convert an analog input signal into a digital signal. In some instances, performing method 1500 may produce a higher signal-to-noise ratio by reducing the presence of noise in the input signal and noise created by an ADC. In some embodiments, steps 1510-1530 may be performed in a different order than shown.

In step 1510, ADC 300 (e.g., using integrators 320 and 330, collectively referred to herein as a second-order "integrator") integrates a value at a first node (e.g., node 304). In one embodiment, this value is a charge that is created by a current produced by reverse-biasing a photodiode (e.g., one or more of photodiodes 410-430). In one embodiment, the second-order integrator includes a first integrator (e.g., integrator 320) and a second integrator (e.g., integrator 330), where the first integrator is coupled to one or more metal-oxide-silicon (MOS) capacitors (e.g. capacitors 620) that produce a feedback signal for the first integrator. In some embodiments, when ADC 300 is integrating the value, ADC 300 uses a first MOS capacitor (e.g., capacitor 620A) to provide the feedback signal for the first integrator in response to the input of the ADC having a current within a first range, and uses the first MOS capacitor and a second MOS capacitor (e.g., capacitors 620A and 620B) to provide the feedback signal in response to the input of the ADC having a current within a second range.

In step 1520, ADC 300 (e.g., using DAC 310) receives a digital output of the comparator (e.g., comparator 340). In one embodiment, the digital output is a logical one in response to an input of the comparator being less than a specified reference voltage (e.g., provided by source 802). In one embodiment, the digital output is a logical zero in response to an input of the comparator being equal to or exceeding the reference voltage.

In step 1530, ADC 300 (e.g., using DAC 310) generates a first charge or a second charge (i.e., a first analog output value or a second analog output value). In one embodiment, the value at the first node is based in part on the generated charge, and the first and second charges are asymmetric. To generate the first and second charges, a DAC, in one embodiment, includes a positive charge pump (e.g., pump 510) and a negative charge pump (e.g., pump 520). In one embodiment, the positive charge pump produces the first charge by increasing an input voltage (e.g., provided by sources 512B and 512C). In one embodiment, the negative charge pump produces the second charge by inverting an input voltage (e.g., provided by source 522B). In one embodiment, the positive charge pump is adapted to charge a first set of one or more capacitors (e.g., capacitors 516) to produce the first charge, and the negative charge pump is adapted to charge a second set of one or more capacitors (e.g., capacitors 526) to produce the second charge. In some embodiments, the first set of one or more capacitors has a greater effective capacitance than the second set of one or more capacitors. In one embodiment, the positive charge pump charges a first set of one or more capacitors (e.g., capacitor 516A) in response to the input of the ADC having a signal strength being within a first range, and charges a second set of one or more capacitors (e.g., capacitor 516A and capacitor 516B) in response to the input of the ADC having a signal strength being with a second range. In some embodiments, the first set of one or more capacitors has a lower effective capacitance than the second set of one or more capacitors. In one embodiment, the DAC produces the first and second charges simultaneously. The DAC may then select, based on the digital output of the comparator, one of the first and second charges. The DAC may then provide the selected charge to the first node and the non-selected charge to a dummy load.

In some embodiments, ADC 300 performs method 1500 to sample a first current created by a photodiode (e.g., photodiodes 410-430) in response to reflected light produced by a light source (e.g., one or more LEDs 135) plus ambient light during a first period (e.g., proximity cycle 1420 or 1470), and to sample a second current created by the photodiode in response to light not produced by the light source (e.g., ambient light) during a second period (e.g., cycles 1410 or both cycles 1460A and 1460B). In one embodiment, the second period (e.g., cycles 1460A and 1460B) is twice as long as the first period (e.g., cycle 1470). In one embodiment, the first period is between 10 μs and 50 μs. In some embodiments, ADC 300 adjusts lengths of the first and second periods based on strengths of the first and second currents Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a second-order delta-sigma analog-to-digital converter (ADC), comprising:
a second-order integrator adapted to second-order integrate a value at a first node, wherein the first node is coupled to an input of the ADC;
a comparator coupled to an output of the second-order integrator; and
a digital-to-analog converter (DAC) coupled between an output of the comparator and the first node, wherein the DAC is adapted to receive a digital output of the comparator and to generate a first charge corresponding to a first logical value or a second charge corresponding to a second logical value, wherein the DAC includes a first charge pump adapted to generate the first charge and a second charge pump adapted to generate the second charge, wherein the value at the first node is based in part on the generated charge;
wherein a magnitude of first charge is at least twice a magnitude of the second charge.

2. The apparatus of claim 1, wherein the first charge pump is a positive charge pump, wherein the second charge pump is a negative charge pump, and wherein the first and second logical values are a logical 1 voltage value and a logical 0 voltage value, respectively.

3. The apparatus of claim 2, wherein the first charge pump is adapted to charge a first set of one or more capacitors to produce the first charge, and wherein the second charge pump is adapted to charge a second set of one or more capacitors to produce the second charge, and wherein the first set of one or more capacitors has a greater effective capacitance than the second set of one or more capacitors.

4. The apparatus of claim 2, wherein the first charge pump is adapted to charge a first set of one or more capacitors in response to the input of the ADC having a signal strength being within a first range, and to charge a second set of one or more capacitors in response to the input of the ADC having a signal strength being with a second range, wherein the first set of one or more capacitors has a lower effective capacitance than the second set of one or more capacitors.

5. The apparatus of claim 1, wherein the DAC is adapted to generate the first and second charges simultaneously, and wherein the DAC is further adapted to:
select, based on the digital output of the comparator, one of the first and second charges;
provide the selected charge to the first node; and
provide the non-selected charge to a dummy load.

6. The apparatus of claim 1, wherein the second-order integrator includes a first integrator and a second integrator, and wherein the first integrator is coupled to one or more metal-oxide-silicon (MOS) capacitors adapted to produce a feedback signal for the first integrator.

7. The apparatus of claim 6, wherein the one or more MOS capacitors includes a first MOS capacitor and a second MOS capacitor, and wherein the ADC is adapted to:
use the first MOS capacitor to provide the feedback signal for the first integrator in response to the input of the ADC having a current within a first range; and
use the first and second MOS capacitors to provide the feedback signal in response to the input of the ADC having a current within a second range.

8. The apparatus of claim 1, wherein the apparatus is an optical sensor, and wherein the input to the ADC is coupled to an output of a photodiode.

9. The apparatus of claim 8, wherein the ADC is adapted to sample a first current created by the photodiode in response to reflected light produced by a light source during a first period, and wherein the ADC is adapted to sample a second current created by the photodiode in response to ambient light during a second period.

10. The apparatus of claim 9 wherein the second period is at least twice as long as the first period.

11. The apparatus of claim 9, wherein the first period is between 10 μs and 50 μs.

12. The apparatus of claim 9, wherein the ADC is adapted to adjust lengths of the first and second periods based on strengths of the first and second currents.

13. A method, comprising:
receiving an analog signal at a node of a delta-sigma analog-to-digital converter (ADC), wherein the analog signal is a based on an input of the ADC and an output of a digital-to-analog converter (DAC) of the ADC;
the ADC performing a second-order integration of the analog signal to produce a digital value;
based on the digital value, the DAC selecting a first charge corresponding to a first logical value or a second charge corresponding to a second logical value, wherein the first and second charges are generated by separate charge pumps of the DAC, and wherein a magnitude of the first charge is at least twice a magnitude of the second charge; and
the DAC providing the selected charge to the first node.

14. The method of claim 13, further comprising:
the DAC using the charge pumps to simultaneously produce the first and second charges; and
the DAC providing the non-selected charge to a dummy load.

15. The method of claim 13, wherein performing the second-order integration includes performing a first integration using a first integrator, wherein the first integrator includes a feedback loop, and wherein the method further comprises:
prior to performing the first integration, selecting a number of MOS capacitors to be present in the feedback loop based on a gain of the DAC.

16. The method of claim 13, wherein the input of the ADC is a signal produced by a photodiode.

17. The method of claim 16, wherein the ADC is included in a proximity sensor, and wherein the method further comprises:
sampling ambient light received by the photodiode during a first period; and
sampling reflected light produced by a light source of the proximity sensor during a second period.

18. The method of claim 17, wherein the first period is at least twice as long as the second period.

19. An apparatus, comprising:
a second-order delta-sigma analog-to-digital converter (ADC), comprising:
a second-order integrator adapted to second-order integrate a value at a first node, wherein the first node is coupled to an input of the ADC;
a comparator coupled to an output of the second order integrator; and
digital-to-analog converter (DAC) adapted to provide a first analog output value or a second analog output value to the first node based on an output of the comparator;
wherein the first and second analog output values are asymmetric.

20. The apparatus of claim 19, wherein the apparatus includes a proximity sensor.

21. The apparatus of claim 19, wherein a magnitude of first analog output value is at least three times a magnitude of the second analog output value.

22. The apparatus of claim 19, wherein the DAC is adapted to simultaneously generate the first and second analog output values by using separate first and second charge pumps, and to select one of the first and second analog output values to provide to the first node.

23. The apparatus of claim 22, wherein the first charge pump is adapted to charge a first set of one or more capacitors to produce the first analog output value, and wherein the second charge pump is adapted to charge a second set of one or more capacitors to produce the second analog output value, and wherein the first set of one or more capacitors has a greater effective capacitance than the second set of one or more capacitors.

* * * * *